(12) United States Patent
Kawasaki et al.

(10) Patent No.: US 11,962,942 B2
(45) Date of Patent: Apr. 16, 2024

(54) COMMUNICATION SYSTEM AND COMMUNICATION METHOD

(71) Applicant: OLYMPUS CORPORATION, Hachioji (JP)

(72) Inventors: Shinya Kawasaki, Hino (JP); Kiyoshi Toyoda, Hachioji (JP)

(73) Assignee: OLYMPUS CORPORATION, Tokyo (JP)

( * ) Notice: Subject to any disclaimer, the term of this patent is extended or adjusted under 35 U.S.C. 154(b) by 225 days.

(21) Appl. No.: 17/684,536

(22) Filed: Mar. 2, 2022

(65) Prior Publication Data

US 2022/0191436 A1    Jun. 16, 2022

Related U.S. Application Data

(63) Continuation of application No. PCT/JP2019/050267, filed on Dec. 23, 2019.

(51) Int. Cl.
*H04N 23/60* (2023.01)
*H04N 7/18* (2006.01)

(52) U.S. Cl.
CPC ............. *H04N 7/183* (2013.01); *H04N 23/60* (2023.01)

(58) Field of Classification Search
CPC ........... H04N 1/36; H04N 7/183; H04N 23/60
See application file for complete search history.

(56) References Cited

U.S. PATENT DOCUMENTS

2012/0323073 A1*  12/2012  Azuma .............. A61B 1/00009
                                                           600/110
2013/0016199 A1*   1/2013  Kobayashi ............... G09G 5/12
                                                           348/E7.085
(Continued)

FOREIGN PATENT DOCUMENTS

JP    2013-000452 A     1/2013
JP    2013-022054 A     2/2013
WO    2015/156057 A1   10/2015
(Continued)

OTHER PUBLICATIONS

International Search Report dated Mar. 17, 2020, issued in counterpart application No. PCT/JP2019/050267, w/ English translation (4 pages).

(Continued)

*Primary Examiner* — Kyle M Lotfi
(74) *Attorney, Agent, or Firm* — WHDA, LLP

(57) ABSTRACT

A communication system includes a transmission terminal and a reception terminal. One of the transmission terminal and the reception terminal includes a processor. The processor is configured to calculate an adjustment value indicating a difference between an imaging cycle and a display cycle. The processor is configured to cause the imaging cycle and the display cycle to match each other by adjusting a signal generator on the basis of the adjustment value. A connection history in which adjustment information and identification information of a communicator are associated with each other is recorded on a recording medium. The processor is configured to adjust the signal generator on the basis of the adjustment value indicated by the adjustment information when the first communicator and the second communicator connect to each other again.

7 Claims, 23 Drawing Sheets

(56) References Cited

U.S. PATENT DOCUMENTS

2017/0034402 A1* 2/2017 Kimura .................... H04N 5/77
2018/0152612 A1* 5/2018 Kudo ................... H04N 5/2226

FOREIGN PATENT DOCUMENTS

WO     2017/168552 A1    10/2017
WO     2018/235258 A1    12/2018

OTHER PUBLICATIONS

Office Action dated Nov. 7, 2023, issued in counterpart JP application No. 2021-566385, with English translation. (4 pages).

* cited by examiner

| No | IDENTIFICATION INFORMATION | ADJUSTMENT VALUE |
|---|---|---|
| 1 | A0000xxxx | 0x01ff |
| 2 | A0100xxxx | 0x033b |
| 3 | B0001xxxx | 0x00a0 |

| No | IDENTIFICATION INFORMATION | ADJUSTMENT VALUE | TEMPERATURE OF TRANSMISSION TERMINAL | TEMPERATURE OF RECEPTION TERMINAL |
|---|---|---|---|---|
| 1 | A0000xxxx | 0x01ff | 30 | 35 |
| 2 | A0100xxxx | 0x033b | 35 | 35 |
| 3 | B0001xxxx | 0x00a0 | 40 | 40 |

| No | MAC ADDRESS | ADJUSTMENT VALUE |
|---|---|---|
| 1 | 12:34:56:78:9a:bc<br>12:34:56:78:9a:bd<br>12:34:56:78:9a:be | 0x01ff |
| 2 | ff:fe:fd:ab:cd:ef<br>ff:fe:fd:ab:cd:d0<br>ff:fe:fd:ab:cd:d1 | 0x033b |
| 3 | 99:88:77:66:55:44<br>99:88:77:66:55:45<br>99:88:77:66:55:46 | 0x00a0 |

COMMUNICATION SYSTEM AND COMMUNICATION METHOD

The present application is a continuation application based on International Patent Application No. PCT/JP2019/050267 filed on Dec. 23, 2019, the content of which is incorporated herein by reference.

BACKGROUND OF THE INVENTION

Field of the Invention

The present invention relates to a communication system and a communication method.

Description of Related Art

A wireless system is known that includes a transmission terminal (imaging terminal) and a reception terminal (display terminal) and transmits video data in real time. It is necessary to synchronize an imaging timing in the transmission terminal and a display timing in the reception terminal with each other. For example, timings in each terminal are synchronized with a vertical synchronization signal. Hereinafter, the vertical synchronization signal is expressed as Vsync. Imaging tunings in the transmission terminal are synchronized with a Vsync for imaging, and display timings in the reception terminal are synchronized with a Vsync for display.

Each Vsync is generated on the basis of an original oscillation clock output from an oscillator mounted in each terminal. Even when each terminal is designed such that the oscillation cycle of the original oscillation clock of each terminal is identical, the oscillation cycle of the original oscillation clock of each terminal has a cycle deviation unique to each terminal. Therefore, the cycle of each Vsync is unique to each terminal.

A wireless packet for synchronization is used in order to synchronize the Vsync for imaging and the Vsync for display with each other. Hereinafter, the wireless packet is expressed as a synchronization packet. In some cases, deterioration of communication quality due to a change in a wireless environment, interference in communication with other systems, or the like occurs, and a period during which synchronization packets are not received continues. In such a case, timings of the Vsync of terminals gradually deviate from each other due to the influence of the cycle of the Vsync unique to each terminal. If the period during which synchronization packets are not received further continues, the timing of the Vsync for imaging and the timing of the Vsync for display greatly deviate from each other and video data are lost. If the video data are lost, the reception terminal cannot display a video corresponding to the lost video data. Therefore, the smoothness of the video is lost, or a blackout of the video occurs.

In order to avoid this, a technique of synchronizing not only timings (phases) but also cycles of the Vsync of terminals with each other is provided. For example, PCT International Publication No. WO2018/235258 proposes a method of synchronizing vertical synchronization signals (Vsync for imaging) of scopes (imaging terminals) with each other on the basis of vertical synchronization signals (V sync for display) of monitors connected to processors in a wireless endoscope system.

SUMMARY OF THE INVENTION

According to a first aspect of the present invention, a communication system includes a transmission terminal and a reception terminal. The transmission terminal includes a first signal generator and a first communicator. The first signal generator is configured to generate a first synchronization signal that defines an imaging cycle. The first communicator is configured to transmit an image generated by an imaging device that performs imaging of a subject in accordance with the first synchronization signal. The reception terminal includes a second communicator and a second signal generator. The second communicator is configured to receive the image transmitted by the first communicator. The second signal generator is configured to generate a second synchronization signal that defines a display cycle. The image received by the second communicator is output to a display device that displays the image in accordance with the second synchronization signal. One of the transmission terminal and the reception terminal includes a recording medium and a processor configured to adjust one of the first signal generator and the second signal generator. The processor is configured to calculate an adjustment value indicating a difference between the imaging cycle and the display cycle after the first communicator and the second communicator connect to each other. The processor is configured to cause the imaging cycle and the display cycle to match each other by adjusting the first signal generator on the basis of the adjustment value in a first case in which the transmission terminal includes the processor. The processor is configured to cause the imaging cycle and the display cycle to match each other by adjusting the second signal generator on the basis of the adjustment value in a second case in which the reception terminal includes the processor. A connection history in which adjustment information and identification information are associated with each other is recorded on the recording medium. The adjustment information directly or indirectly indicates the adjustment value. The identification information indicates one of the first communicator and the second communicator. The processor is configured to adjust the first signal generator on the basis of the adjustment value indicated by the adjustment information associated with the identification information corresponding to the second communicator in the connection history when the first communicator and the second communicator connect to each other again in the first case. The processor is configured to adjust the second signal generator on the basis of the adjustment value indicated by the adjustment information associated with the identification information corresponding to the first communicator in the connection history when the first communicator and the second communicator connect to each other again in the second case.

According to a second aspect of the present invention, in the first aspect, the transmission terminal may further include a first temperature sensor. The reception terminal may further include a second temperature sensor. The temperature measured by each of the first temperature sensor and the second temperature sensor may be associated with the adjustment information and the identification information in the connection history. The processor may be configured to determine whether or not to correct the adjustment value on the basis of the temperature measured by each of the first temperature sensor and the second temperature sensor and the temperature associated with the identification information corresponding to one of the first communicator and the second communicator in the connection history when the first communicator and the second communicator connect to each other again. The processor may be configured to correct the adjustment value indicated by the adjustment information associated with the identification information corresponding to one of the first communicator and the second communicator in the connection history on the basis of temperature characteristics of an original oscillation clock of each of the first synchronization signal and the second synchronization signal when the processor determines to correct the adjustment value. The processor may be configured to adjust the first signal generator on the basis of the corrected adjustment value in the first case. The processor may be configured to adjust the second signal generator on the basis of the corrected adjustment value in the second case.

According to a third aspect of the present invention, in the first aspect, the transmission terminal may include the processor. The processor may be configured to acquire the identification information indicating the second communicator each time the first communicator and the second communicator connect to each other. The processor may be configured to record the connection history in which the adjustment information and the identification information are associated with each other on the recording medium when the processor calculates the adjustment value. The processor may be configured to determine whether or not the newly acquired identification information is the same as the identification information recorded on the recording medium when the first communicator and the second communicator connect to each other again. The processor may be configured to adjust the first signal generator on the basis of the adjustment value indicated by the adjustment information associated with the identification information in the connection history when the processor determines that the newly acquired identification information is the same as the identification information recorded on the recording medium.

According to a fourth aspect of the present invention, in the third aspect, the imaging device may include one or more first wireless modules. The first communicator may be one of the one or more first wireless modules. The reception terminal may include two or more second wireless modules. The second communicator may be one of the two or more second wireless modules. The first communicator and the second communicator may perform wireless communication. The identification information may be a media access control (MAC) address of one of the two or more wireless modules. The identification information of each of the two or more second wireless modules may be associated with the adjustment information in the connection history.

According to a fifth aspect of the present invention, in the first aspect, the reception terminal may include the processor. The processor may be configured to acquire the identification information indicating the first communicator each time the first communicator and the second communicator connect to each other. The processor may be configured to record the connection history in which the adjustment information and the identification information are associated with each other on the recording medium when the processor calculates the adjustment value. The processor may be configured to determine whether or not the newly acquired identification information is the same as the identification information recorded on the recording medium when the first communicator and the second communicator connect to each other again. The processor may be configured to adjust the second signal generator on the basis of the adjustment value indicated by the adjustment information associated with the identification information in the connection history when the processor determines that the newly acquired identification information is the same as the identification information recorded on the recording medium.

According to a sixth aspect of the present invention, in the fifth aspect, the communication system may include two or more of the reception terminals.

According to a seventh aspect of the present invention, a communication method includes a calculation step executed by a processor included in one of a transmission terminal and a reception terminal, a first adjustment step executed by the processor, and a second adjustment step executed by the processor. The transmission terminal includes a first signal generator and a first communicator. The first signal generator is configured to generate a first synchronization signal that defines an imaging cycle. The first communicator is configured to transmit an image generated by an imaging device that performs imaging of a subject in accordance with the first synchronization signal. The reception terminal includes a second communicator and a second signal generator. The second communicator is configured to receive the image transmitted by the first communicator. The second signal generator is configured to generate a second synchronization signal that defines a display cycle. The image received by the second communicator is output to a display device that displays the image in accordance with the second synchronization signal. The processor calculates an adjustment value indicating a difference between the imaging cycle and the display cycle in the calculation step after the first communicator and the second communicator connect to each other. The processor causes the imaging cycle and the display cycle to match each other by adjusting the first signal generator on the basis of the adjustment value in the first adjustment step in a first case in which the transmission terminal includes the processor. The processor causes the imaging cycle and the display cycle to match each other by adjusting the second signal generator on the basis of the adjustment value in the first adjustment step in a second case in which the reception terminal includes the processor. A connection history in which adjustment information and identification information are associated with each other is recorded on a recording medium. The adjustment information directly or indirectly indicates the adjustment value. The identification information indicates one of the first communicator and the second communicator. The processor adjusts the first signal generator on the basis of the adjustment value indicated by the adjustment information associated with the identification information corresponding to the second communicator in the connection history in the second adjustment step when the first communicator and the second communicator connect to each other again in the first case. The processor adjusts the second signal generator on the basis of the adjustment value indicated by the adjustment information associated with the identification information corresponding to the first communicator in the connection history in the second adjustment step when the first communicator and the second communicator connect to each other again in the second case.

DETAILED DESCRIPTION OF THE INVENTION

Hereinafter, embodiments of the present invention will be described with reference to the drawings.

First Embodiment

Figure 1:
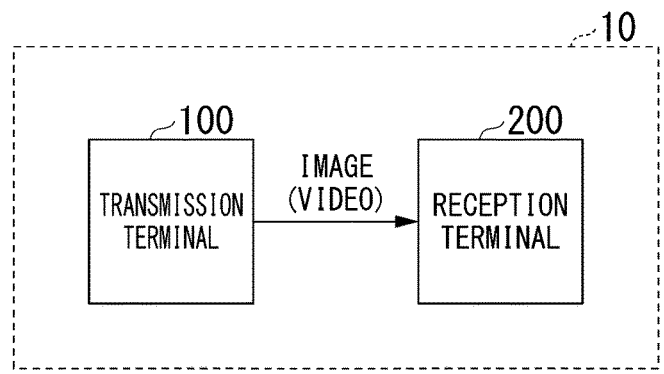
FIG. 1 is a block diagram showing a configuration of a communication system according to a first embodiment of the present invention.

FIG. 1 shows a configuration of a communication system 10 according to a first embodiment of the present invention. The communication system 10 shown in FIG. 1 includes a transmission terminal 100 and a reception terminal 200. The transmission terminal 100 and the reception terminal 200 perform communication for transmitting an image (video).

Figure 2:
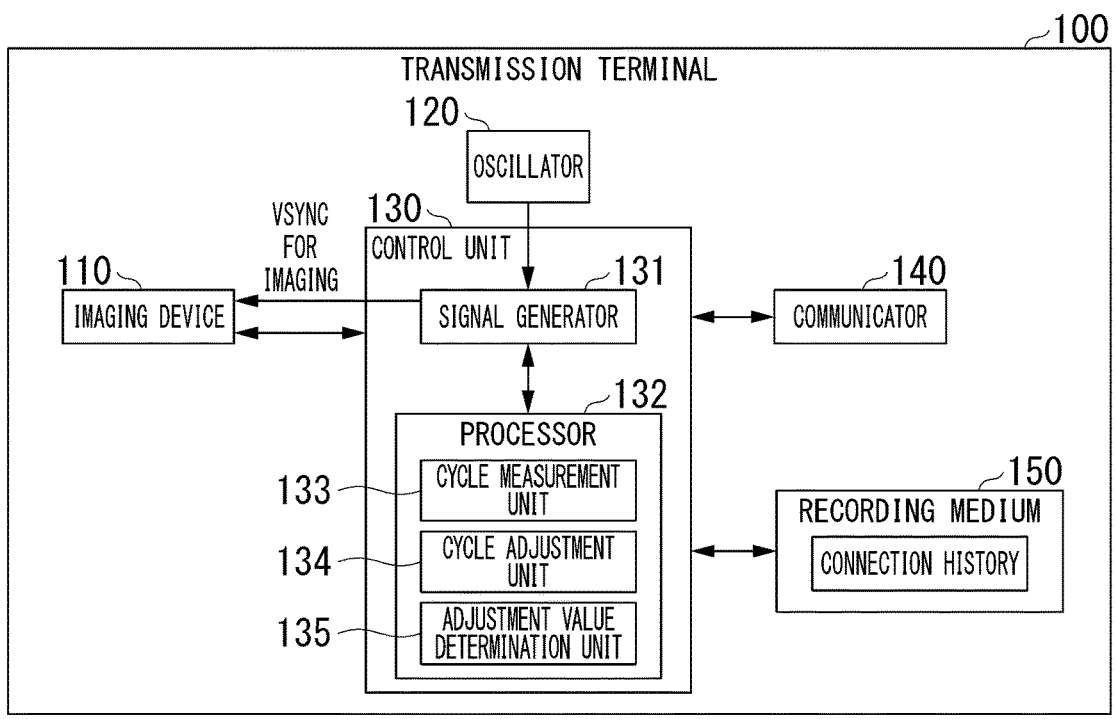
FIG. 2 is a block diagram showing a configuration of a transmission terminal according to the first embodiment of the present invention.

FIG. 2 shows a configuration of the transmission terminal 100. The transmission terminal 100 shown in FIG. 2 includes an imaging device 110, an oscillator 120, a control unit 130, a communicator 140 (first communicator), and a recording medium 150. The control unit 130 includes a signal generator 131 (first signal generator) and a processor 132.

Figure 3:
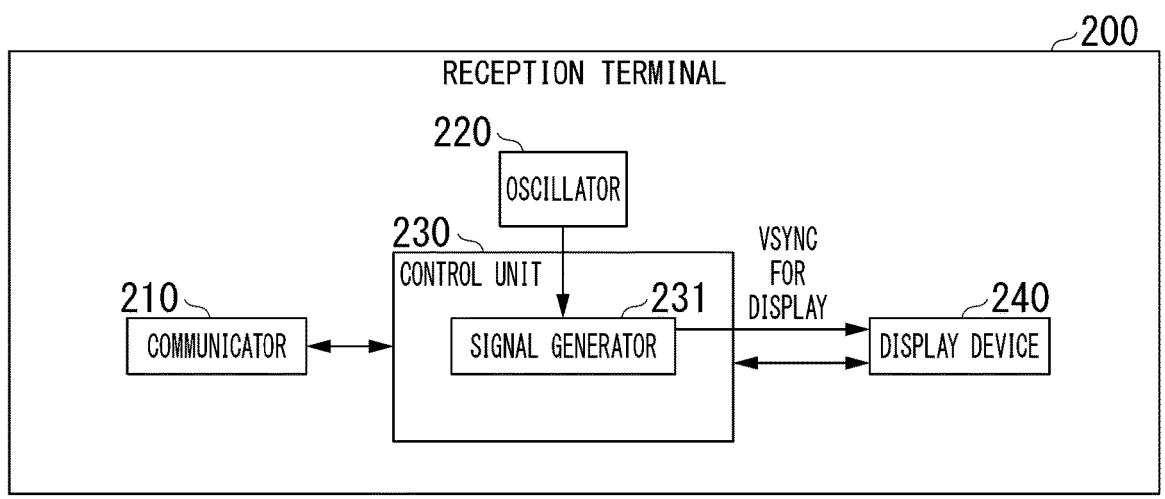
FIG. 3 is a block diagram showing a configuration of a reception terminal according to the first embodiment of the present invention.

FIG. 3 shows a configuration of the reception terminal 200. The reception terminal 200 shown in FIG. 3 includes a communicator 210 (second communicator), an oscillator 220, a control unit 230, and a display device 240. The control unit 230 includes a signal generator 231 (second signal generator).

A schematic configuration of the transmission terminal 100 and the reception terminal 200 will be described. The signal generator 131 generates a first synchronization signal that defines an imaging cycle. The imaging device 110 performs imaging of a subject in accordance with the first synchronization signal. The communicator 140 transmits an image generated by the imaging device 110. The communicator 210 receives the image transmitted by the communicator 140. The signal generator 231 generates a second synchronization signal that defines a display cycle. The image received by the communicator 210 is output to the display device 240. The display device 240 displays the image in accordance with the second synchronization signal. After the communicator 140 and the communicator 210 connect to each other, the processor 132 calculates an adjustment value indicating the difference between the imaging cycle and the display cycle. The processor 132 causes the imaging cycle and the display cycle to match each other by adjusting the signal generator 131 on the basis of the adjustment value. A connection history in which adjustment information and identification information are associated with each other is recorded on the recording medium 150. The adjustment information directly or indirectly indicates the adjustment value. The identification information indicates one of the communicator 140 and the communicator 210. When the communicator 140 and the communicator 210 connect to each other again, if the identification information corresponding to one of the communicator 140 and the communicator 210 is recorded on the recording medium 150, the processor 132 adjusts the signal generator 131 on the basis of the adjustment value indicated by the adjustment information associated with the identification information in the connection history.

Each time the communicator 140 and the communicator 210 connect to each other, the processor 132 acquires the identification information indicating the communicator 210. In the first embodiment, the communicator 210 transmits the identification information to the communicator 140. The processor 132 receives the identification information from the communicator 210 by using the communicator 140. When the processor 132 calculates the adjustment value, the processor 132 records the connection history in which the adjustment information and the identification information are associated with each other on the recording medium 150. When the communicator 140 and the communicator 210 connect to each other again, the processor 132 determines whether or not the newly acquired identification information is the same as the identification information recorded on the recording medium 150. When the processor 132 determines that the newly acquired identification information is the same as the identification information recorded on the recording medium 150, the processor 132 adjusts the signal generator 131 on the basis of the adjustment value indicated by the adjustment information associated with the identification information in the connection history.

A detailed configuration of the transmission terminal 100 will be described. The imaging device 110 is an image sensor such as a complementary metal-oxide-semiconductor (CMOS) sensor. The imaging device 110 generates an image at a timing indicated by a vertical synchronization signal (Vsync for imaging) generated by the signal generator 131. The Vsync for imaging includes a pulse generated repeatedly. The cycle of the V sync for imaging is a time interval at which the pulse is generated. The cycle of the Vsync for imaging indicates the imaging cycle. For example, in a case in which the imaging device 110 is driven at 60 fps, the imaging cycle is 16.6 milliseconds. The speed (frame rate) at which the imaging device 110 is driven is not limited to 60 fps. One image (one frame) is generated in each imaging cycle. The imaging device 110 sequentially generates a plurality of images, thus generating a video. The imaging device 110 outputs an image to the control unit 130.

For example, the oscillator 120 is a crystal oscillator. The oscillator 120 generates an original oscillation clock and outputs the original oscillation clock to the signal generator 131.

The signal generator 131 is a sync generator. The signal generator 131 generates the first synchronization signal on the basis of the original oscillation clock output from the oscillator 120. The first synchronization signal includes a vertical synchronization signal (Vsync for imaging) and a horizontal synchronization signal. The horizontal synchronization signal includes a pulse generated repeatedly. The cycle of the horizontal synchronization signal is a time interval at which the pulse is generated. The cycle of the horizontal synchronization signal indicates a timing at which each row in a pixel array of the imaging device 110 is scanned. Hereinafter, an example in which the cycle of the Vsync for imaging is used for adjusting the cycle of a synchronization signal will be described. The signal generator 131 outputs the first synchronization signal to the imaging device 110. The signal generator 131 includes a cycle counter that defines the cycle of the Vsync for imaging. The cycle of the Vsync for imaging is adjusted by adjusting a value measured by the cycle counter of the signal generator 131.

For example, the processor 132 is at least one of a central processing unit (CPU), a digital signal processor (DSP), and a graphics-processing unit (GPU). The processor 132 may be constituted by a logic circuit such as an application-specific integrated circuit (ASIC) or a field-programmable gate array (FPGA). The transmission terminal 100 may include a plurality of processors.

The processor 132 outputs the image output from the imaging device 110 to the communicator 140. The processor 132 has a function as a cycle measurement unit 133, a cycle adjustment unit 134, and an adjustment value determination unit 135.

The cycle measurement unit 133 measures the difference between the imaging cycle and the display cycle and calculates an adjustment value indicating the difference. The cycle adjustment unit 134 adjusts the signal generator 131 on the basis of the adjustment value. The signal generator 131 is adjusted such that the cycle (imaging cycle) of the Vsync for imaging generated by the signal generator 131 matches the display cycle.

When the communicator 140 and the communicator 210 connect to each other again, the adjustment value determination unit 135 determines whether or not the identification information received from the communicator 210 is included in the connection history recorded on the recording medium 150. When the identification information received from the communicator 210 is included in the connection history, the adjustment value determination unit 135 determines an available adjustment value for adjusting the imaging cycle. When the adjustment value determination unit 135 determines that the identification information received from the communicator 210 is included in the connection history, the cycle adjustment unit 134 adjusts the signal generator 131 on the basis of the adjustment value associated with the identification information in the connection history.

The oscillation cycle of the original oscillation clock generated by the oscillator 120 has a cycle deviation unique to the oscillator 120. This deviation is the difference between an ideal cycle in design and a real cycle. Similarly, the oscillation cycle of the original oscillation clock generated by the oscillator 220 has a cycle deviation unique to the oscillator 220. When the environment in which the transmission terminal 100 and the reception terminal 200 are disposed does not change, it is assumed that an oscillation cycle deviation of the original oscillation clock does not change. Therefore, the adjustment value used in previous connection can be used to adjust the imaging cycle when the communicator 140 and the communicator 210 connect to each other again.

The processor 132 may read a program and execute the read program. The program includes commands defining the operations of the processor 132. In other words, the functions of the processor 132 may be realized by software. The program, for example, may be provided by using a "computer-readable recording medium" such as a flash memory. The program may be transmitted from a computer storing the program to the transmission terminal 100 through a transmission medium or by using carrier waves in a transmission medium. The "transmission medium" transmitting a program is a medium that has a function of transmitting information. The medium that has the function of transmitting information includes a network (communication network) such as the Internet and a communication circuit line (communication line) such as a telephone circuit line. The program described above may realize at least some of the functions described above. Furthermore, the program described above may be a differential file (differential program). The combination of a program that has already been recorded in a computer and a differential program may realize the functions described above.

The communicator 140 performs communication with the communicator 210. For example, the communicator 140 is a wireless module including an antenna and a wireless circuit. The communicator 140 emits radio waves to the communicator 210 or receives radio waves emitted from the communicator 210, thus performing wireless communication. The communicator 140 may be connected to a cable and may perform wired communication.

The processor 132 transmits an image or information to the reception terminal 200 by using the communicator 140. Specifically, the processor 132 controls the communicator 140 such that an image or information is transmitted to the reception terminal 200. In other words, the processor 132 causes the communicator 140 to transmit an image or information for the reception terminal 200. In this way, the communicator 140 transmits an image or information to the reception terminal 200. The processor 132 receives information from the reception terminal 200 by using the communicator 140. Specifically, the processor 132 controls the communicator 140 such that information is received from the reception terminal 200. In other words, the processor 132 causes the communicator 140 to receive information from the reception terminal 200. In this way, the communicator 140 receives information from the reception terminal 200.

The recording medium 150 is a volatile or nonvolatile recording medium. For example, the recording medium 150 is at least one of a random-access memory (RAM), a dynamic random-access memory (DRAM), a static random-access memory (SRAM), an electrically erasable programmable read-only memory (EEPROM), a ferroelectric random-access memory (FRAM (registered trademark)), a flash memory, and a hard disk drive.

The recording medium 150 stores the connection history. In the connection history, the adjustment value calculated by the cycle measurement unit 133 and the identification information indicating the communicator 210 are associated with each other. The connection history may include a plurality of combinations of the adjustment value and the identification information.

For example, the identification information is a media access control (MAC) address of the communicator 210. Information indicating the reception terminal 200 may be used as the identification information of the communicator 210. For example, the identification information may be a serial number by which the reception terminal 200 is uniquely identified.

In the example shown in FIG. 2, the imaging device 110 is included in the transmission terminal 100. The transmission terminal 100 does not need to include the imaging device 110. The imaging device 110 may be disposed outside the transmission terminal 100 and may be connected to the transmission terminal 100 in a wireless or wired manner. In the example shown in FIG. 2, the recording medium 150 is included in the transmission terminal 100. The transmission terminal 100 does not need to include the recording medium 150. The recording medium 150 may be disposed outside the transmission terminal 100 and may be connected to the transmission terminal 100 in a wireless or wired manner.

A detailed configuration of the reception terminal 200 will be described. The communicator 210 performs communication with the communicator 140. For example, the communicator 210 is a wireless module including an antenna and a wireless circuit. The communicator 210 emits radio waves to the communicator 140 or receives radio waves emitted from the communicator 140, thus performing wireless communication. The communicator 210 may be connected to a cable and may perform wired communication. The communicator 210 receives an image or information transmitted from the transmission terminal 100. In other words, the communicator 210 transmits information to the transmission terminal 100.

For example, the oscillator 220 is a crystal oscillator. The oscillator 220 generates an original oscillation clock and outputs the original oscillation clock to the signal generator 231.

The control unit 230 outputs the image output from the communicator 210 to the display device 240. The signal generator 231 is a sync generator. The signal generator 231 generates the second synchronization signal on the basis of the original oscillation clock output from the oscillator 220. The second synchronization signal includes a vertical synchronization signal (Vsync for display) and a horizontal synchronization signal. The cycle of the horizontal synchronization signal indicates a timing at which each row in a display of the display device 240 is scanned. Hereinafter, an example in which the cycle of the Vsync for display is used for adjusting the cycle of a synchronization signal will be described. The signal generator 231 outputs the second synchronization signal to the display device 240. The control unit 230 may include a processor.

The display device 240 is a monitor. For example, the display device 240 is a liquid crystal display or an electroluminescence (EL) display. The display device 240 displays an image at a timing indicated by the vertical synchronization signal (Vsync for display) generated by the signal generator 231. The Vsync for display includes a pulse generated repeatedly. The cycle of the Vsync for display is a time interval at which the pulse is generated. The cycle of the Vsync for display indicates the display cycle. For example, in a case in which the display device 240 updates an image at 60 fps, the display cycle is 16.6 milliseconds. The speed (frame rate) at which the display device 240 updates an image is not limited to 60 fps. One image (one frame) is displayed in each display cycle. The display device 240 sequentially displays a plurality of images, thus displaying a video.

In the example shown in FIG. 3, the display device 240 is included in the reception terminal 200. The reception terminal 200 does not need to include the display device 240. The display device 240 may be disposed outside the reception terminal 200 and may be connected to the reception terminal 200 in a wireless or wired manner.

Figure 4:
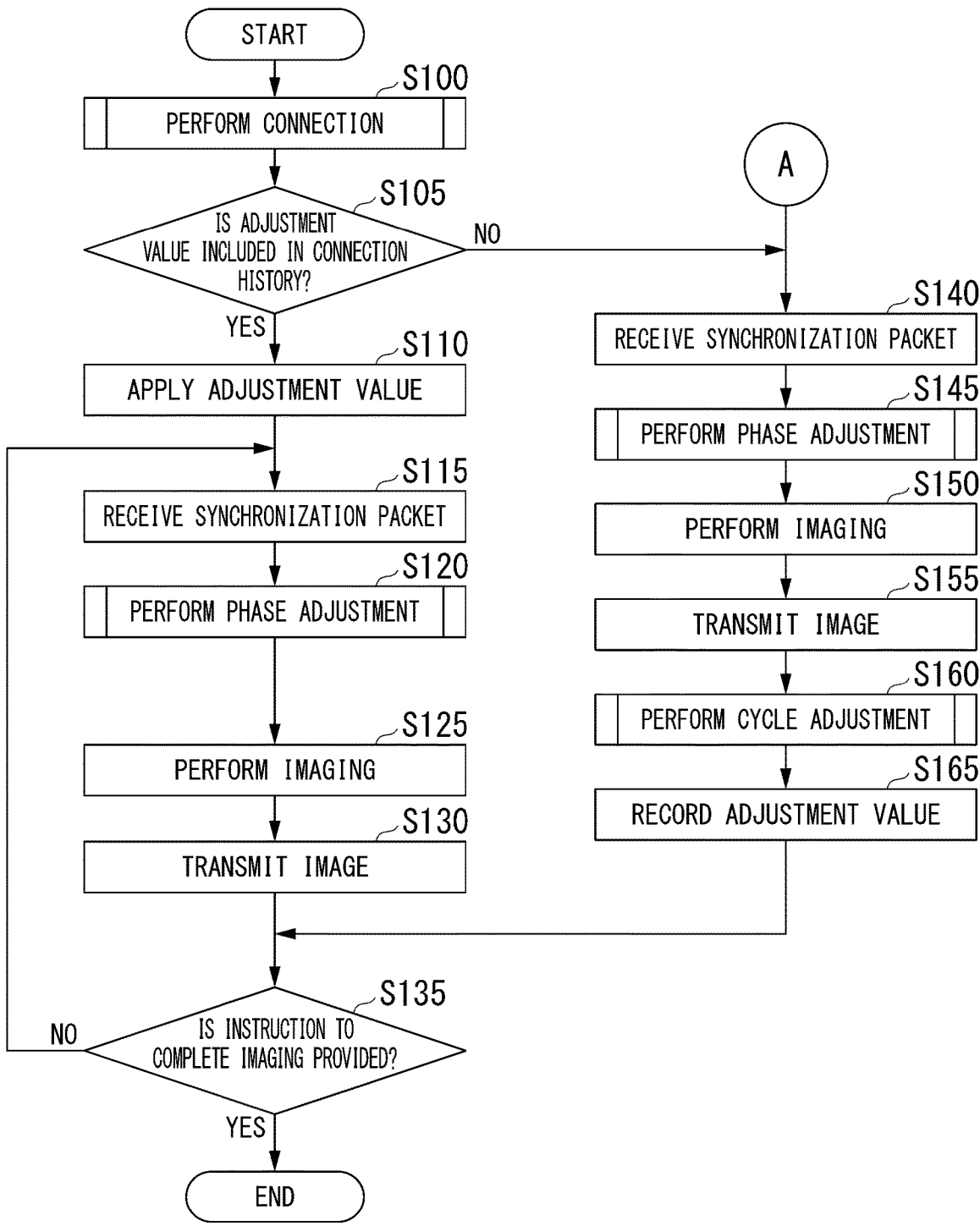
FIG. 4 is a flow chart showing a procedure of an operation of the transmission terminal according to the first embodiment of the present invention.

An operation of the transmission terminal 100 will be described. FIG. 4 shows a procedure of the operation of the transmission terminal 100.

The processor 132 executes connection processing (Step S100). The processor 132 connects to the communicator 210 of the reception terminal 200 by using the communicator 140 in the connection processing. When the connection processing is executed, a communication link between the transmission terminal 100 and the reception terminal 200 is established and data communication becomes available. Details of Step S100 will be described later.

In the connection processing, the communicator 140 receives the identification information of the communicator 210 from the communicator 210, thus acquiring the identification information of the communicator 210. After Step S100, the processor 132 determines whether or not the identification information received from the communicator 210 is included in the connection history recorded on the recording medium 150. In this way, the processor 132 determines whether or not the adjustment value is included in the connection history (Step S105).

When the communicator 140 and the communicator 210 connect to each other for the first time, the adjustment value and the identification information of the communicator 210 are not included in the connection history. When the identification information is not included in the connection history, the processor 132 determines that the adjustment value is not included in the connection history. When the communicator 140 and the communicator 210 have a history of connecting to each other and the communicator 140 and the communicator 210 connect to each other again, the adjustment value and the identification information of the communicator 210 are included in the connection history. When the identification information is included in the connection history, the processor 132 determines that the adjustment value is included in the connection history.

When the processor 132 determines that the adjustment value is included in the connection history in Step S105, the processor 132 reads the adjustment value associated with the identification information received from the communicator 210 in the connection history from the recording medium 150. The processor 132 adjusts the cycle of the V sync for imaging by applying the adjustment value to the signal generator 131 (Step S110). In this way, the cycle of the Vsync for imaging and the cycle of the Vsync for display match each other. The method of adjusting the cycle of the Vsync for imaging in Step S110 is similar to that of adjusting the cycle of the V sync for imaging in Step S1625 (see FIG. 9) described later.

After the communicator 140 and the communicator 210 connect to each other, the communicator 210 transmits a synchronization packet to the communicator 140 in each cycle of the Vsync for display. For example, in a case in which the display cycle is 16.6 milliseconds, the communicator 210 periodically transmits the synchronization packet to the communicator 140 at intervals of 16.6 milliseconds. The synchronization packet includes information used for adjusting the phase and the cycle of the Vsync for imaging. Since synchronization adjustment processing is executed in the transmission terminal 100, the synchronization packet is transmitted a predetermined time before the timing at which the pulse of the Vsync for display is output.

After Step S110, the communicator 140 waits in order to receive the synchronization packet. When the synchronization packet is transmitted from the communicator 210, the communicator 140 receives the synchronization packet. The processor 132 acquires the synchronization packet from the communicator 140 (Step S115).

After Step S115, the processor 132 performs phase adjustment (Step S120). The processor 132 causes the timing of the Vsync for imaging to match the timing of the Vsync for display in Step S120, thus causing the phase of the Vsync for imaging to match the phase of the V sync for display. Details of Step S120 will be described later.

After Step S120, the processor 132 causes the imaging device 110 to perform imaging. The imaging device 110 performs imaging and generates an image (Step S125). After Step S125, the processor 132 transmits the image to the communicator 210 by using the communicator 140 (Step S130). An image on which image processing such as compression processing is performed may be transmitted.

After Step S130, the processor 132 determines whether or not an instruction to complete imaging is provided (Step S135). For example, the transmission terminal 100 includes an operation unit operated by a user. The processor 132 determines whether or not the instruction to complete imaging is provided on the basis of an operation result of the operation unit in Step S135. For example, when an instruction to turn off the power source of the transmission terminal 100 is provided, the processor 132 determines that the instruction to complete imaging is provided. When the instruction to turn off the power source of the transmission terminal 100 is not provided, the processor 132 determines that the instruction to complete imaging is not provided.

When the processor 132 determines that the instruction to complete imaging is provided in Step S135, the processing shown in FIG. 4 is completed. In this case, the processor 132 cuts off the connection between the communicator 140 and the communicator 210. When the processor 132 determines that the instruction to complete imaging is not provided in Step S135, Step S115 is executed.

When the processor 132 determines that the adjustment value is not included in the connection history in Step S105, the communicator 140 waits in order to receive the synchronization packet. When the synchronization packet is transmitted from the communicator 210, the communicator 140 receives the synchronization packet. The processor 132 acquires the synchronization packet from the communicator 140 (Step S140).

After Step S140, the processor 132 performs the phase adjustment (Step S145). Step S145 is similar to Step S120.

After Step S145, the processor 132 causes the imaging device 110 to perform imaging. The imaging device 110 performs imaging in accordance with the Vsync for imaging and generates an image (Step S150). After Step S150, the processor 132 transmits the image to the communicator 210 by using the communicator 140 (Step S155).

After Step S155, the processor 132 performs cycle adjustment (Step S160). The processor 132 causes the cycle of the Vsync for imaging to match the cycle of the Vsync for display in Step S160. Details of Step S160 will be described later.

After Step S160, the processor 132 associates the adjustment value calculated in Step S160 and the identification information of the communicator 210 with each other. The processor 132 records the connection history including the adjustment value and the identification information on the recording medium 150 (Step S165). After Step S165, Step S135 is executed.

Figures 5, 6:
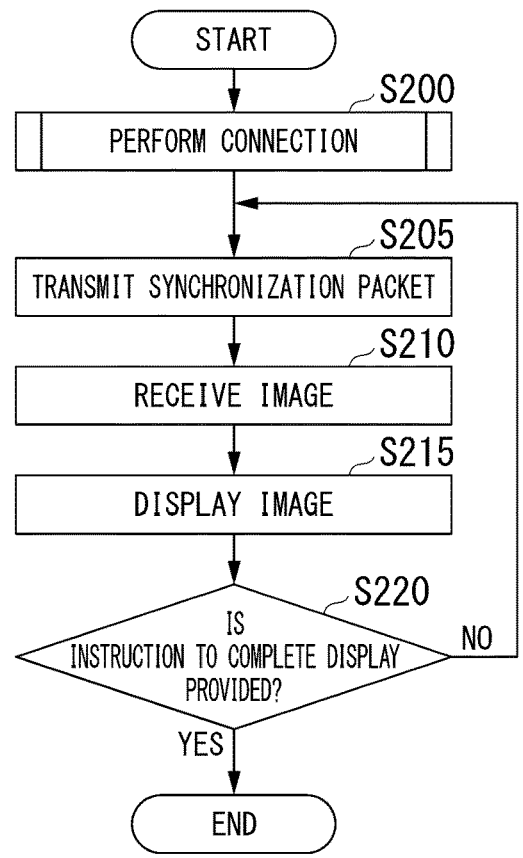
FIG. 5 is a diagram showing a connection history in the first embodiment of the present invention.
FIG. 6 is a flow chart showing a procedure of an operation of the reception terminal according to the first embodiment of the present invention.

FIG. 5 shows an example of the connection history recorded on the recording medium 150. The identification information and the adjustment value in the same row are associated with each other. For example, identification information "A0000xxxx" and an adjustment value "0x01ff" are associated with each other.

The processor 132 may record a time point at which the adjustment value is calculated or a time point at which the cycle is adjusted on the basis of the adjustment value on the recording medium 150 along with the identification information and the adjustment value in Step S165. When a predetermined time has passed from the time point recorded on the recording medium 150, the processor 132 may delete the adjustment value associated with the time point. Alternatively, when a predetermined time has passed from the time point recorded on the recording medium 150, the processor 132 does not need to use the adjustment value associated with the time point in Step S110.

The cycle adjustment in Step S160 may be performed twice or more. For example, the cycle adjustment may be performed on a regular basis while the connection between the communicator 140 and the communicator 210 continues.

When the communicator 140 and the communicator 210 connect to each other for the first time, the identification information of the communicator 210 is not included in the connection history. Therefore, the cycle adjustment is performed in Step S160 and the adjustment value is recorded on the recording medium 150 in Step S165.

When the communicator 140 and the communicator 210 connect to each other next, the identification information of the communicator 210 is included in the connection history. Therefore, the adjustment value associated with the identification information is read from the recording medium 150, and the cycle of the Vsync for imaging is adjusted by using the adjustment value in Step S110.

An operation of the reception terminal 200 will be described. FIG. 6 shows a procedure of the operation of the reception terminal 200.

The control unit 230 executes connection processing (Step S200). The control unit 230 connects to the communicator 140 of the transmission terminal 100 by using the communicator 210 in the connection processing. Details of Step S200 will be described later.

After Step S200, the communicator 210 transmits a synchronization packet to the communicator 140 (Step S205). After Step S205, the communicator 210 receives an image from the communicator 140 (Step S210). The received image is output to the display device 240 via the control unit 230. After Step S210, the display device 240 displays the image in accordance with the Vsync for display (Step S215).

After Step S215, the control unit 230 determines whether or not an instruction to complete display is provided (Step S220). For example, when the processor 132 determines that the instruction to complete imaging is provided in Step S135 shown in FIG. 4, the processor 132 transmits a completion instruction to the communicator 210 by using the communicator 140. When the completion instruction is transmitted from the communicator 140, the communicator 210 receives the completion instruction. When the communicator 210 receives the completion instruction, the control unit 230 determines that the instruction to complete display is provided. When the communicator 210 has not received the completion instruction, the control unit 230 determines that the instruction to complete display is not provided.

The reception terminal 200 may include an operation unit operated by a user. The control unit 230 may determine whether or not the instruction to complete display is provided on the basis of an operation result of the operation unit in Step S220. For example, when an instruction to turn off the power source of the reception terminal 200 is provided, the control unit 230 may determine that the instruction to complete display is provided. When the instruction to turn off the power source of the reception terminal 200 is not provided, the control unit 230 may determine that the instruction to complete display is not provided.

When the control unit 230 determines that the instruction to complete display is provided in Step S220, the processing shown in FIG. 6 is completed. In this case, the control unit 230 cuts off the connection between the communicator 210 and the communicator 140. When the control unit 230 determines that the instruction to complete display is not provided in Step S220, Step S205 is executed.

Figure 7:
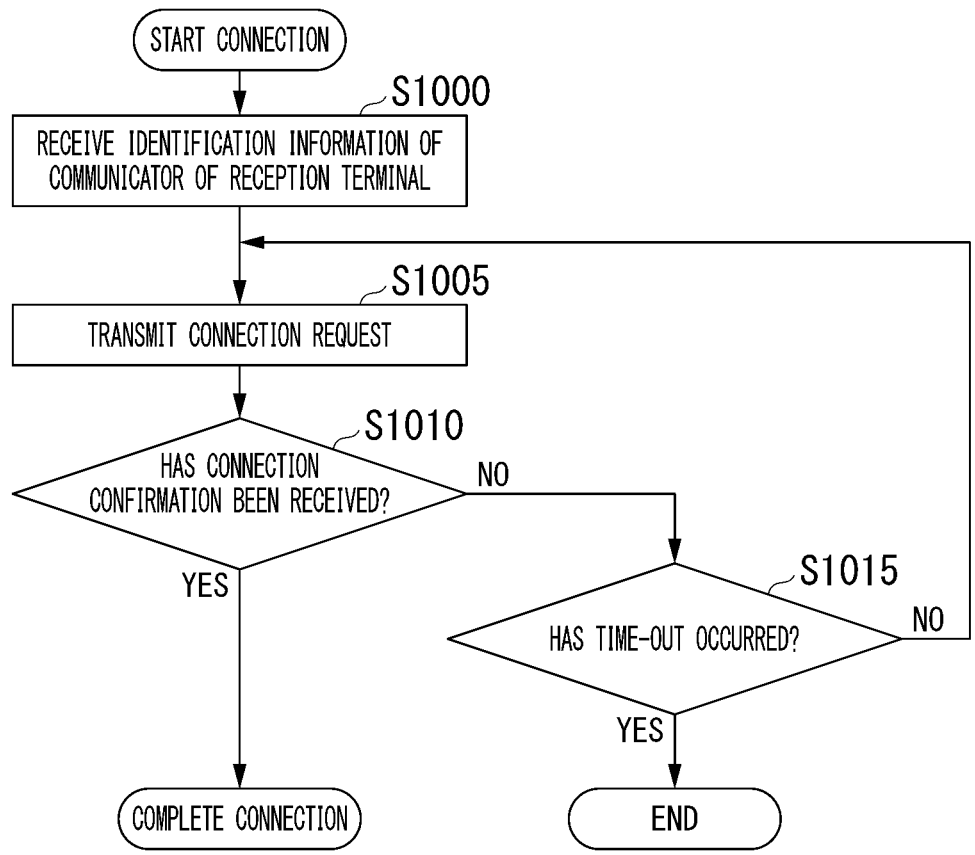
FIG. 7 is a flow chart showing a procedure of an operation of the transmission terminal according to the first embodiment of the present invention.

Details of the connection processing (Step S100) executed in the transmission terminal 100 will be described. FIG. 7 shows a procedure of an operation of the transmission terminal 100 in the connection processing.

The communicator 140 waits in order to receive the identification information indicating the communicator 210 of the reception terminal 200. When the identification information is transmitted from the communicator 210, the communicator 140 receives the identification information. The processor 132 acquires the identification information from the communicator 140 (Step S1000).

After Step S1000, the processor 132 transmit a connection request to the communicator 210 by using the communicator 140 (Step S1005). The communicator 210 receives the connection request and transmits a connection confirmation to the communicator 140.

When the connection confirmation is transmitted from the communicator 210, the communicator 140 receives the connection confirmation. The processor 132 determines whether or not the connection confirmation has been received (Step S1010). For example, the processor 132 determines in Step S1010 whether or not the connection confirmation is received within a predetermined time from the timing at which the connection request is transmitted.

When the processor 132 determines that the connection confirmation has been received in Step S1010, the processing shown in FIG. 7 is completed and Step S105 shown in FIG. 4 is executed. In this case, the connection between the communicator 140 and the communicator 210 is established. The communicator 140 and the communicator 210 can perform communication of an image.

When the processor 132 determines that the connection confirmation has not been received in Step S1010, the processor 132 determines whether or not a time-out has occurred (Step S1015). For example, the processor 132 determines whether or not a time passing from the timing at which the connection request is transmitted for the first time exceeds a predetermined time. If the time exceeds the predetermined time, the processor 132 determines that the time-out has occurred. If the time does not exceed the predetermined time, the processor 132 determines that the time-out has not occurred.

When the processor 132 determines that the time-out has occurred in Step S1015, the processing shown in FIG. 7 and FIG. 4 is completed. When the processor 132 determines that the time-out has not occurred in Step S1015, Step S1005 is executed.

In the above-described example, the communicator 140 receives the identification information from the communicator 210. A communication method of the identification information is not limited to this. For example, the transmission terminal 100 may include two or more communicators including the communicator 140, and the reception terminal 200 may include two or more communicators including the communicator 210. A communicator of the transmission terminal 100 other than the communicator 140 may receive the identification information of the communicator 210 from a communicator of the reception terminal 200 other than the communicator 210. In other words, the transmission terminal 100 may receive the identification information from the reception terminal 200 by using a communicator other than the communicator 140 used for transmitting an image.

Figure 8:
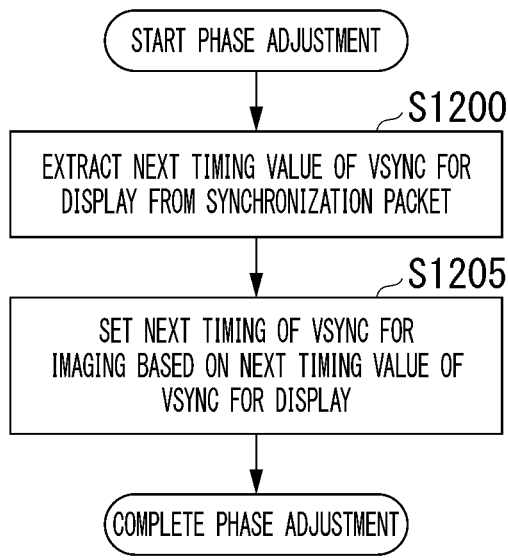
FIG. 8 is a flow chart showing a procedure of an operation of the transmission terminal according to the first embodiment of the present invention.

Details of the phase adjustment (Step S120 and Step S145) performed in the transmission terminal 100 will be described. FIG. 8 shows a procedure of an operation of the transmission terminal 100 in the phase adjustment.

The synchronization packet received in Step S115 or Step S140 includes a value indicating a timing of a next pulse of the Vsync for display. The processor 132 extracts the value from the synchronization packet (Step S1200).

After Step S1200, the processor 132 calculates a timing of a next pulse of the Vsync for imaging on the basis of the value extracted from the synchronization packet. The processor 132 sets the calculated timing in the signal generator 131 (Step S1205). When Step S1205 is executed, the processing shown in FIG. 8 is completed and Step S125 or Step S150 shown in FIG. 4 is executed.

For example, the synchronization packet includes information indicating a time point of a next pulse of the V sync for display. The processor 132 subtracts a value indicating a time point at which the synchronization packet is received from a value indicating the time point of the next pulse of the Vsync for display in Step S1205. In this way, the processor 132 calculates a required time before the timing of the next pulse of the Vsync for imaging. The processor 132 adjusts the signal generator 131 in order to cause the signal generator 131 to generate a pulse of the Vsync for imaging when the calculated time has passed.

In a case in which the synchronization packet is not received in Step S115 or Step S140, imaging is performed without performing the phase adjustment and an image is transmitted.

Figure 9:
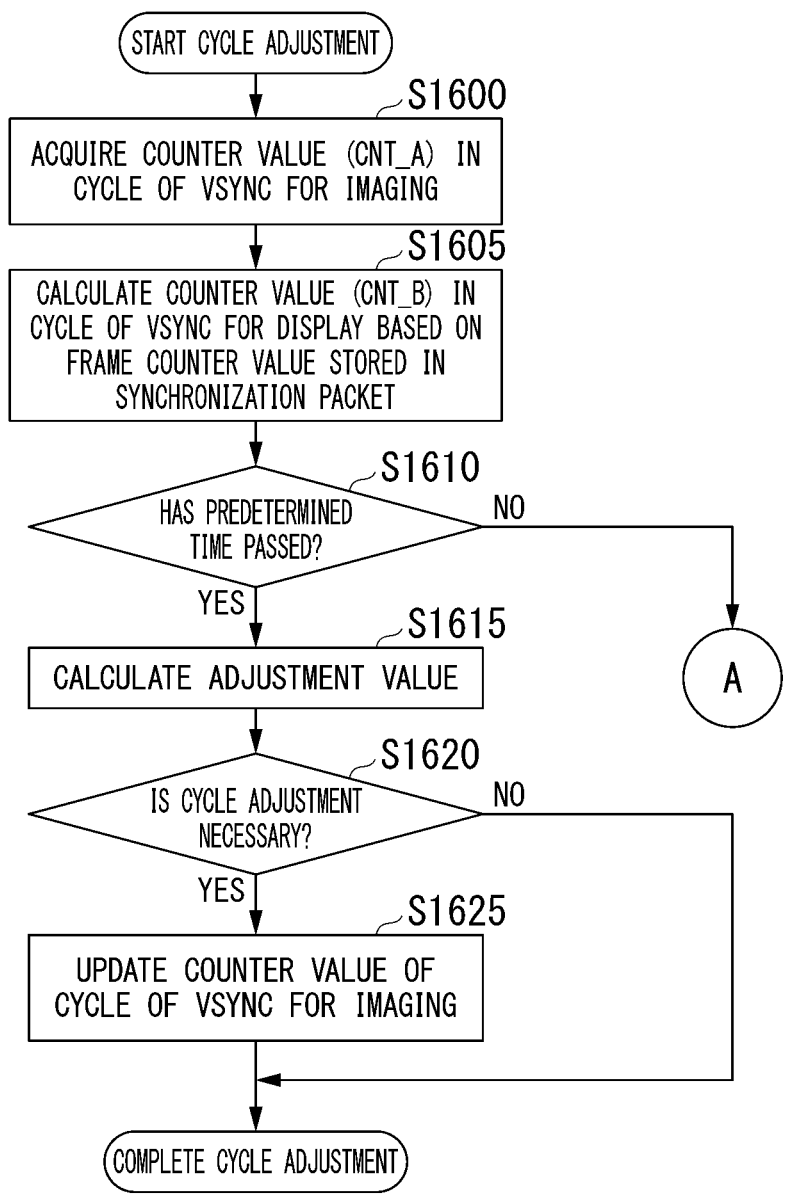
FIG. 9 is a flow chart showing a procedure of an operation of the transmission terminal according to the first embodiment of the present invention.

Details of the cycle adjustment (Step S160) performed in the transmission terminal 100 will be described. FIG. 9 shows a procedure of an operation of the transmission terminal 100 in the cycle adjustment. A similar method to that shown in PCT International Publication No. WO2018/235258 can be applied to the cycle adjustment in the embodiments of the present invention.

The processor 132 acquires a counter value CNT_A in the cycle of the Vsync for imaging from the signal generator 131 (Step S1600). The signal generator 131 includes a counter that measures time. The value (counter value CNT_A) of the counter increases from an initial value at a reference timing. The processor 132 acquires the counter value CNT_A at a timing at which a pulse synchronized with the cycle of the Vsync for imaging is generated in Step S1600. The counter value CNT_A corresponds to the length of a predetermined number of cycles of the V sync for imaging.

After Step S1600, the processor 132 extracts a frame counter value from the synchronization packet received in Step S140. The frame counter value indicates the number of frame periods included in a period starting at the reference timing. For example, in a case in which the imaging cycle and the display cycle are 16.6 milliseconds, the length of one frame period is 16.6 milliseconds. The frame counter value corresponds to a frame number. The processor 132 calculates a counter value CNT_B in the cycle of the Vsync for display on the basis of the frame counter value (Step S1605).

The signal generator 231 of the reception terminal 200 includes a counter that measures time. The value (counter value CNT_B) of the counter increases from an initial value at a reference timing. The counter value CNT_B increases by a fixed value in one frame period. For example, the fixed value is 1000000. The fixed value is not limited to 1000000. The processor 132 calculates the counter value CNT_B by multiplying the fixed value by the frame counter value.

The fixed value may be recorded on the recording medium 150. When the communicator 140 and the communicator 210 connect to each other, the processor 132 may receive the fixed value from the communicator 210 by using the communicator 140. The fixed value may be stored in the synchronization packet.

After Step S1605, the processor 132 determines whether or not a predetermined time has passed (Step S1610). For example, the predetermined time is 60 seconds. The predetermined time may be a time other than 60 seconds. For example, the processor 132 determines a time passing from the timing at which the communicator 140 and the communicator 210 connect to each other. When the time is shorter than the predetermined time, the processor 132 determines that the predetermined time has not passed. When the time is longer than or equal to the predetermined time, the processor 132 determines that the predetermined time has passed.

When the processor 132 determines that the predetermined time has not passed in Step S1610, Step S140 is executed. The synchronization packet is repetitively received and the counter value CNT_A and the counter value CNT_B are repetitively acquired until the predetermined time passes. When the processor 132 determines that the predetermined time has passed in Step S1610, the processor 132 measures the difference between the cycle of the Vsync for imaging and the cycle of the Vsync for display and calculates the adjustment value indicating the difference (Step S1615).

Details of processing executed in Step S1615 by the processor 132 will be described. A plurality of the counter values CNT_A and a plurality of the counter values CNT_B are acquired in a predetermined time. The processor 132 selects a counter value CNT_A and a counter value CNT_B at each of two time points included in the predetermined time. In a case in which the two time points are t0 and t1, the processor 132 selects a counter value CNT_A(t0) and a counter value CNT_B(t0) at the time point t0 and selects a counter value CNT_A(t1) and a counter value CNT_B(t1) at the time point t1.

The processor 132 calculates a cycle Ti of the Vsync for imaging in accordance with the following Expression (1) and calculates a cycle Td of the Vsync for display in accordance with the following Expression (2).

$$Ti=\{CNT\_A(t1)-CNT\_A(t0)\}/(t1-t0) \qquad (1)$$

$$Td=\{CNT\_B(t1)-CNT\_B(t0)\}/(t1-t0) \qquad (2)$$

Furthermore, the processor 132 calculates an adjustment value Va in accordance with the following Expression (3). In other words, the processor 132 calculates the difference between the cycle Ti of the Vsync for imaging and the cycle Td of the Vsync for display, thus calculating the adjustment value Va.

$$Va=Ti-Td \qquad (3)$$

After Step S1615, the processor 132 determines whether or not the cycle adjustment is necessary (Step S1620). The processor 132 calculates the difference between the maximum value of the cycle counter of the signal generator 131 and the maximum value of the cycle counter of the signal generator 231 in Step S1620. The maximum value of each cycle counter will be described later. The processor 132 determines whether or not the adjustment value is less than the difference in Step S1620. When the adjustment value is less than the difference, the processor 132 determines that the cycle adjustment is necessary. When the adjustment value is greater than the difference, the processor 132 determines that the cycle adjustment is unnecessary. For example, when the difference is a value corresponding to 50 ppm and the adjustment value is a value corresponding to 10 ppm, the processor 132 determines that the cycle adjustment is necessary.

The signal generator 131 includes a cycle counter that measures the cycle of the Vsync for imaging. The value of the cycle counter increases from an initial value at a timing at which the cycle of the Vsync for imaging is started. When the value of the cycle counter becomes the maximum value set in advance, the value of the cycle counter is reset to the initial value. The signal generator 131 generates a pulse of the Vsync for imaging on the basis of the value of the cycle counter. For example, the signal generator 131 generates a pulse of the Vsync for imaging at a timing at which the value of the cycle counter is reset.

The signal generator 231 includes a cycle counter that measures the cycle of the Vsync for display. The value of the cycle counter increases from an initial value at a timing at which the cycle of the Vsync for display is started. When the value of the cycle counter becomes the maximum value set in advance, the value of the cycle counter is reset to the initial value. The signal generator 231 generates a pulse of the Vsync for display on the basis of the value of the cycle counter. For example, the signal generator 231 generates a pulse of the Vsync for display at a timing at which the value of the cycle counter is reset.

The maximum value of the cycle counter of each of the signal generator 131 and the signal generator 231 may be recorded on the recording medium 150. When the communicator 140 and the communicator 210 connect to each other, the processor 132 may receive the maximum value of the cycle counter of the signal generator 231 from the communicator 210 by using the communicator 140. The maximum value of the cycle counter of the signal generator 231 may be stored in the synchronization packet.

When the processor 132 determines that the cycle adjustment is necessary in Step S1620, the processor 132 updates the value of the cycle counter of the signal generator 131 on the basis of the calculated adjustment value (Step S1625). The processor 132 causes the cycle of the Vsync for imaging and the cycle of the Vsync for display to match each other by executing Step S1625.

When the adjustment value is positive, the cycle of the Vsync for imaging is longer than that of the Vsync for display. In this case, the processor 132 calculates a new maximum value of the cycle counter of the signal generator 131 by subtracting the adjustment value from the current maximum value in Step S1625 in order to shorten the cycle of the Vsync for imaging. The processor 132 updates the current maximum value of the cycle counter of the signal generator 131 with the new maximum value in Step S1625.

When the adjustment value is negative, the cycle of the Vsync for imaging is shorter than that of the V sync for display. In this case, the processor 132 calculates a new maximum value of the cycle counter of the signal generator 131 by adding the adjustment value to the current maximum value in Step S1625 in order to lengthen the cycle of the Vsync for imaging. The processor 132 updates the current maximum value of the cycle counter of the signal generator 131 with the new maximum value in Step S1625.

When Step S1625 is executed, the processing shown in FIG. 9 is completed and Step S165 shown in FIG. 4 is executed. When the processor 132 determines that the cycle adjustment is unnecessary in Step S1620, the processing shown in FIG. 9 is completed and Step S165 shown in FIG. 4 is executed.

The adjustment value calculated in Step S1625 is recorded on the recording medium 150 in Step S165 shown in FIG. 4. When the processor 132 determines that the cycle adjustment is unnecessary in Step S1620, information indicating that the cycle adjustment is unnecessary may be recorded on the recording medium 150 in Step S165 shown in FIG. 4. The information is associated with the identification information of the communicator 210.

When the processor 132 determines that the identification information received from the communicator 210 is included in the connection history in Step S105 shown in FIG. 4, the processor 132 may execute the following processing. When the adjustment value is associated with the identification information in the connection history, the processor 132 executes Step S110 described above. When the information indicating that the cycle adjustment is unnecessary is associated with the identification information in the connection history, the processor 132 may execute Step S115 without executing Step S110.

In the above-described example, the adjustment value for adjusting the cycle of the Vsync for imaging is the difference between the cycle of the Vsync for imaging and the cycle of the Vsync for display. When the specifications of the original oscillation clock generated by the oscillator 120 of the transmission terminal 100 are the same as those of the original oscillation clock generated by the oscillator 220 of the reception terminal 200, the difference between the deviations of the cycles may be used as the adjustment value. Specifically, the difference (first value) between the cycle of an ideal Vsync for imaging in design and the cycle of an actual Vsync for imaging is calculated. The first value indicates the cycle deviation of the Vsync for imaging. In addition, the difference (second value) between the cycle of an ideal Vsync for display in design and the cycle of an actual Vsync for display is calculated. The second value indicates the cycle deviation of the Vsync for display. The difference between the first value and the second value is the difference between the cycle deviations.

In the above-described example, the adjustment information is configured to be information directly indicating the adjustment value. The adjustment information may be configured to be information indirectly indicating the adjustment value. Necessary information for calculating the adjustment value may be recorded on the recording medium 150 as the adjustment information indirectly indicating the adjustment value. For example, the imaging cycle and the display cycle used for calculating the adjustment value are recorded on the recording medium 150 as the adjustment information. In other words, the cycle Ti of the Vsync for imaging shown in Expression (1) and the cycle Td of the Vsync for display shown in Expression (2) are recorded on the recording medium 150. The processor 132 calculates the adjustment value Va in accordance with Expression (3) and applies the adjustment value Va to the signal generator 131 in Step S110.

Necessary information for calculating the adjustment value is not limited to the imaging cycle and the display cycle. For example, the counter value CNT_A and the counter value CNT_B shown in Expression (1) and Expression (2) may be recorded on the recording medium 150 as the adjustment information. The processor 132 may calculate the cycle Ti of the Vsync for imaging and the cycle Td of the Vsync for display in accordance with Expression (1) and Expression (2) in Step S110. Furthermore, the processor 132 may calculate the adjustment value Va in accordance with Expression (3) and may apply the adjustment value Va to the signal generator 131 in Step S110.

Figure 10:
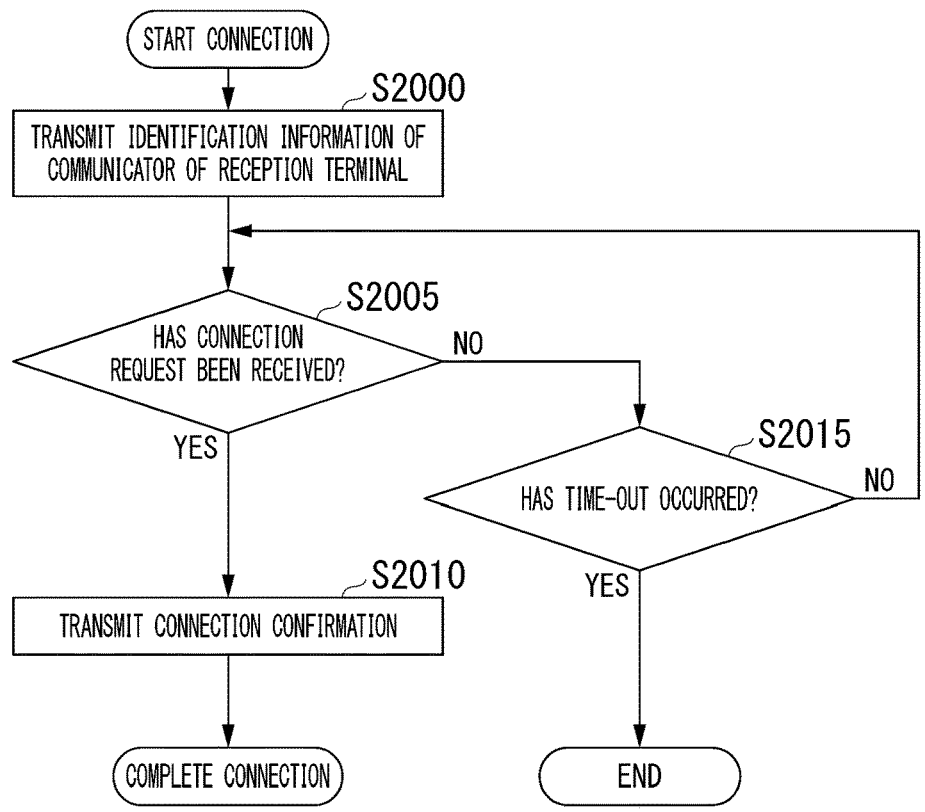
FIG. 10 is a flow chart showing a procedure of an operation of the reception terminal according to the first embodiment of the present invention.

Details of the connection processing (Step S200) executed in the reception terminal 200 will be described. FIG. 10 shows a procedure of an operation of the reception terminal 200 in the connection processing.

The control unit 230 transmits the identification information indicating the communicator 210 to the communicator 140 of the transmission terminal 100 by using the communicator 210 (Step S2000).

After Step S2000, the communicator 210 waits in order to receive a connection request. When a connection request is transmitted from the communicator 140, the communicator 210 receives the connection request. The control unit 230 determines whether or not the connection request has been received (Step S2005). For example, the control unit 230 determines in Step S2005 whether or not the connection request is received within a predetermined time from the timing at which the identification information is transmitted.

When the control unit 230 determines that the connection request has been received in Step S2005, the control unit 230 transmits a connection confirmation to the communicator 140 by using the communicator 210 (Step S2010). When Step S2010 is executed, the processing shown in FIG. 10 is completed and Step S205 shown in FIG. 6 is executed. In this case, the connection between the communicator 140 and the communicator 210 is established. The communicator 140 and the communicator 210 can perform communication of an image.

When the control unit 230 determines that the connection request has not been received in Step S2005, the control unit 230 determines whether or not a time-out has occurred (Step S2015). For example, the control unit 230 determines whether or not a time passing from the timing at which the identification information is transmitted in Step S2000 exceeds a predetermined time. If the time exceeds the predetermined time, the control unit 230 determines that the time-out has occurred. If the time does not exceed the predetermined time, the control unit 230 determines that the time-out has not occurred.

When the control unit 230 determines that the time-out has occurred in Step S2015, the processing shown in FIG. 10 and FIG. 6 is completed. When the control unit 230 determines that the time-out has not occurred in Step S2015, Step S2005 is executed.

In the above-described example, the communicator 210 transmits the identification information of the communicator 210 to the communicator 140. In a case in which the transmission terminal 100 includes two or more communicators and the reception terminal 200 includes two or more communicators, a communicator of the reception terminal 200 other than the communicator 210 may transmit the identification information of the communicator 210 to a communicator of the transmission terminal 100 other than the communicator 140. In other words, the reception terminal 200 may transmit the identification information to the transmission terminal 100 by using a communicator other than the communicator 210 used for receiving an image.

In the above-described example, the cycle of the vertical synchronization signal (Vsync for imaging) is adjusted. The cycle of the horizontal synchronization signal may be adjusted by using a similar method to that described above.

A communication method according to each aspect of the present invention includes a calculation step, a first adjustment step, and a second adjustment step. After the communicator 140 and the communicator 210 connect to each other, the processor 132 calculates an adjustment value indicating the difference between the imaging cycle and the display cycle in the calculation step (Step S1615). The processor 132 causes the imaging cycle and the display cycle to match each other by adjusting the signal generator 131 on the basis of the adjustment value in the first adjustment step (Step S1625). A connection history in which adjustment information and identification information are associated with each other is recorded on the recording medium 150. The adjustment information directly or indirectly indicates the adjustment value. The identification information indicates one of the communicator 140 and the communicator 210. When the communicator 140 and the communicator 210 connect to each other again, if the identification information corresponding to one of the communicator 140 and the communicator 210 is recorded on the recording medium 150, the processor 132 adjusts the signal generator 131 on the basis of the adjustment value indicated by the adjustment information associated with the identification information in the connection history in the second adjustment step (Step S110).

The communication method according to each aspect of the present invention does not need to include steps other than the calculation step, the first adjustment step, or the second adjustment step.

In the first embodiment, when the communicator 140 and the communicator 210 connect to each other again, the processor 132 determines whether or not the identification information of the communicator 210 is recorded on the recording medium 150. When the identification information of the communicator 210 is recorded on the recording medium 150, the processor 132 adjusts the signal generator 131 on the basis of the adjustment value indicated by the adjustment information associated with the identification information in the connection history. In this case, the processor 132 does not need to execute Step S160 shown in FIG. 4. Therefore, the communication system 10 can cause the cycle of the synchronization signal of the transmission terminal 100 and the cycle of the synchronization signal of the reception terminal 200 to match each other in a short period of time.

In a case in which Step S110 is executed, the cycle of the Vsync for imaging and the cycle of the Vsync for display match each other in a short period of time. After Step S120 shown in FIG. 4 is executed, a state in which the Vsync for imaging and the Vsync for display are synchronized with each other is likely to be maintained. Therefore, the communication system 10 can avoid loss of video data.

Modified Example of First Embodiment

Figure 11:
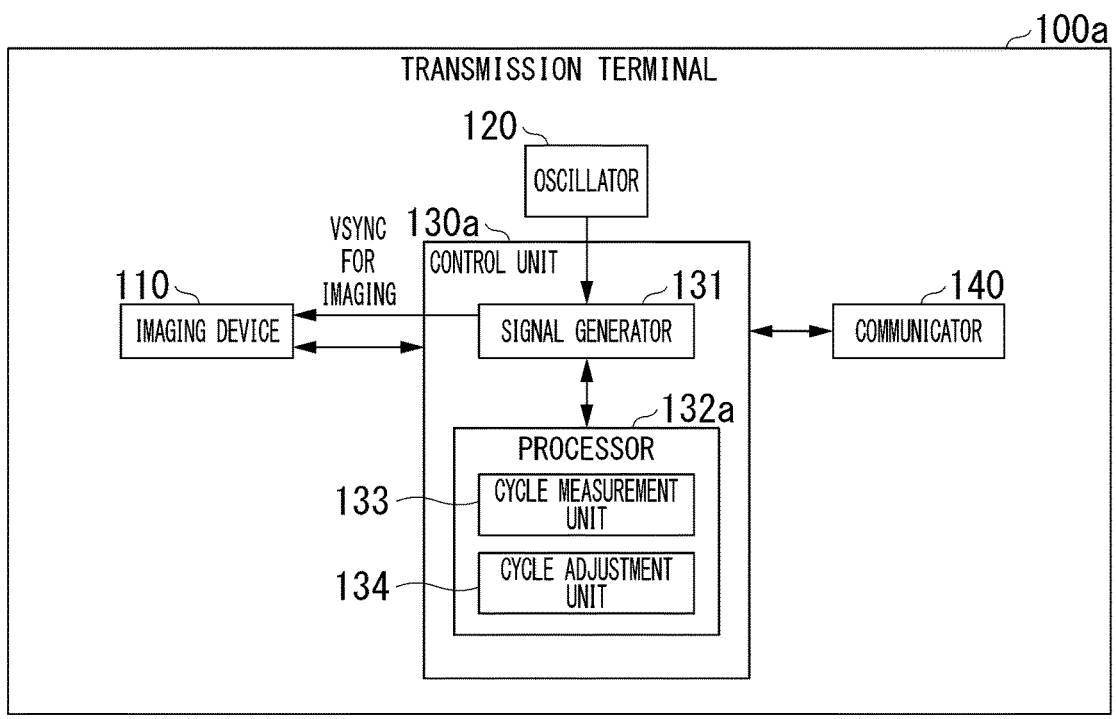
FIG. 11 is a block diagram showing a configuration of a transmission terminal according to a modified example of the first embodiment of the present invention.

A modified example of the first embodiment of the present invention will be described. The transmission terminal 100 shown in FIG. 2 is changed to a transmission terminal 100a shown in FIG. 11. FIG. 11 shows a configuration of the transmission terminal 100a. The same configuration as that shown in FIG. 2 will not be described.

In the transmission terminal 100a, the control unit 130 shown in FIG. 2 is changed to a control unit 130a. In the control unit 130a, the processor 132 shown in FIG. 2 is changed to a processor 132a. The processor 132a has a function as a cycle measurement unit 133 and a cycle adjustment unit 134. The processor 132a does not have a function as the adjustment value determination unit 135 shown in FIG. 2. The transmission terminal 100a does not include the recording medium 150 shown in FIG. 2.

When the communicator 140 and the communicator 210 connect to each other, the communicator 140 transmits identification information indicating the communicator 140 to the communicator 210. For example, the identification information is the MAC address of the communicator 140. Information indicating the transmission terminal 100a may be used as the identification information of the communicator 140. For example, the identification information may be a serial number by which the transmission terminal 100a is uniquely identified.

Figure 12:
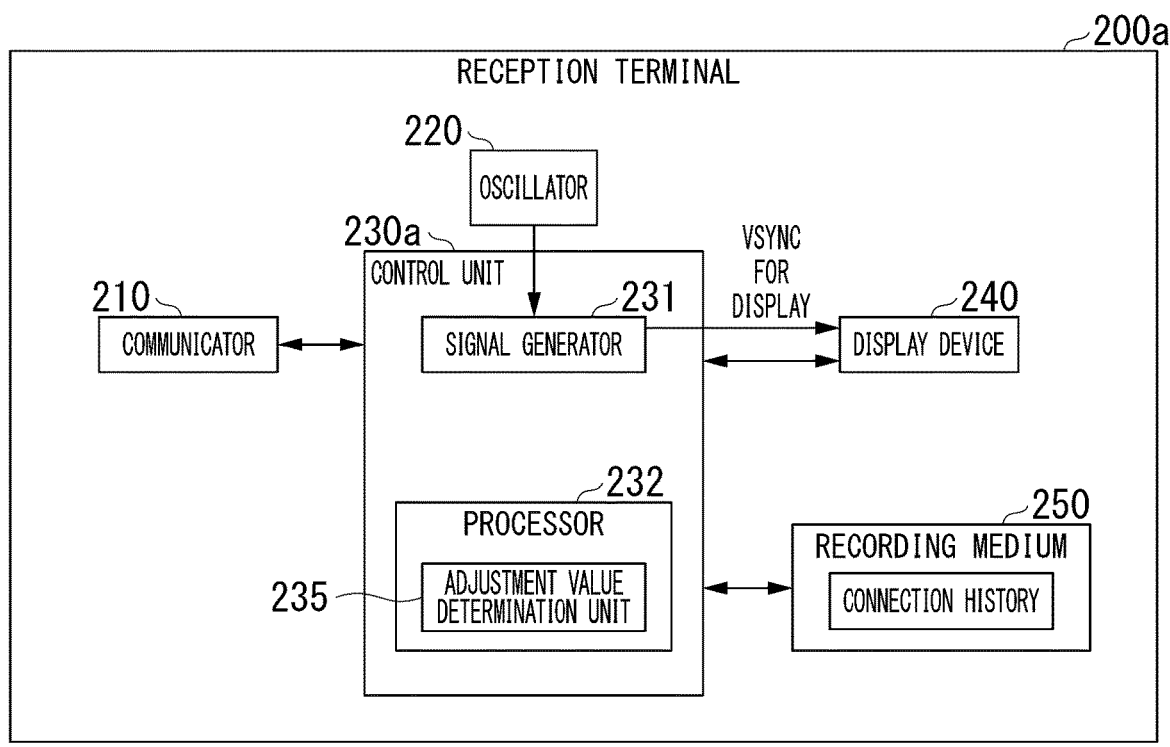
FIG. 12 is a block diagram showing a configuration of a reception terminal according to the modified example of the first embodiment of the present invention.

The reception terminal 200 shown in FIG. 3 is changed to a reception terminal 200a shown in FIG. 12. FIG. 12 shows a configuration of the reception terminal 200a. The same configuration as that shown in FIG. 3 will not be described.

The reception terminal 200a includes a recording medium 250. The recording medium 250 is a volatile or nonvolatile recording medium. For example, the recording medium 250 is at least one of a RAM, a DRAM, an SRAM, an EEPROM, an FRAM (registered trademark), a flash memory, and a hard disk drive.

The recording medium 250 stores a connection history. In the connection history, the adjustment value calculated by the cycle measurement unit 133 and the identification information indicating the communicator 140 are associated with each other.

In the reception terminal 200a, the control unit 230 shown in FIG. 3 is changed to a control unit 230a. The control unit 230a includes a signal generator 231 and a processor 232.

The processor 232 has a function as an adjustment value determination unit 235. When the communicator 140 and the communicator 210 connect to each other again, the adjustment value determination unit 235 determines whether or not the identification information received from the communicator 140 is included in the connection history recorded on the recording medium 250. When the identification information received from the communicator 140 is included in the connection history, the adjustment value determination unit 235 determines an available adjustment value for adjusting the imaging cycle.

The processor 232 may read a program and execute the read program. The program includes commands defining the operations of the processor 232. In other words, the functions of the processor 232 may be realized by software. The program is realized similarly to that that realizes the functions of the processor 132.

The processor 232 transmits information to the transmission terminal 100a by using the communicator 210. Specifically, the processor 232 controls the communicator 210 such that information is transmitted to the transmission terminal 100a. In other words, the processor 232 causes the communicator 210 to transmit information for the transmission terminal 100a. In this way, the communicator 210 transmits information to the transmission terminal 100a. The processor 232 receives an image or information from the transmission terminal 100a by using the communicator 210. Specifically, the processor 232 controls the communicator 210 such that an image or information is received from the transmission terminal 100a. In other words, the processor 232 causes the communicator 210 to receive an image or information from the transmission terminal 100a. In this way, the communicator 210 receives an image or information from the transmission terminal 100a.

Each time the communicator 140 and the communicator 210 connect to each other, the processor 232 acquires the identification information indicating the communicator 140. In the modified example of the first embodiment, the communicator 140 transmits the identification information to the communicator 210. The processor 232 receives the identification information from the communicator 140 by using the communicator 210. When the processor 132a calculates the adjustment value, the processor 132a transmits adjustment information indicating the adjustment value to the communicator 210 by using the communicator 140. The processor 232 receives the adjustment information from the communicator 140 by using the communicator 210. The processor 232 records the connection history in which the adjustment information and the identification information are associated with each other on the recording medium 250.

When the communicator 140 and the communicator 210 connect to each other again, the processor 232 determines whether or not the newly acquired identification information is the same as the identification information recorded on the recording medium 250. When the processor 232 determines that the newly acquired identification information is the same as the identification information recorded on the recording medium 250, the processor 232 transmits the adjustment information associated with the identification information in the connection history to the communicator 140 by using the communicator 210. The processor 132a receives the adjustment information from the communicator 210 by using the communicator 140. The processor 132a adjusts the signal generator 131 on the basis of the adjustment information received from the communicator 210.

Figure 13:
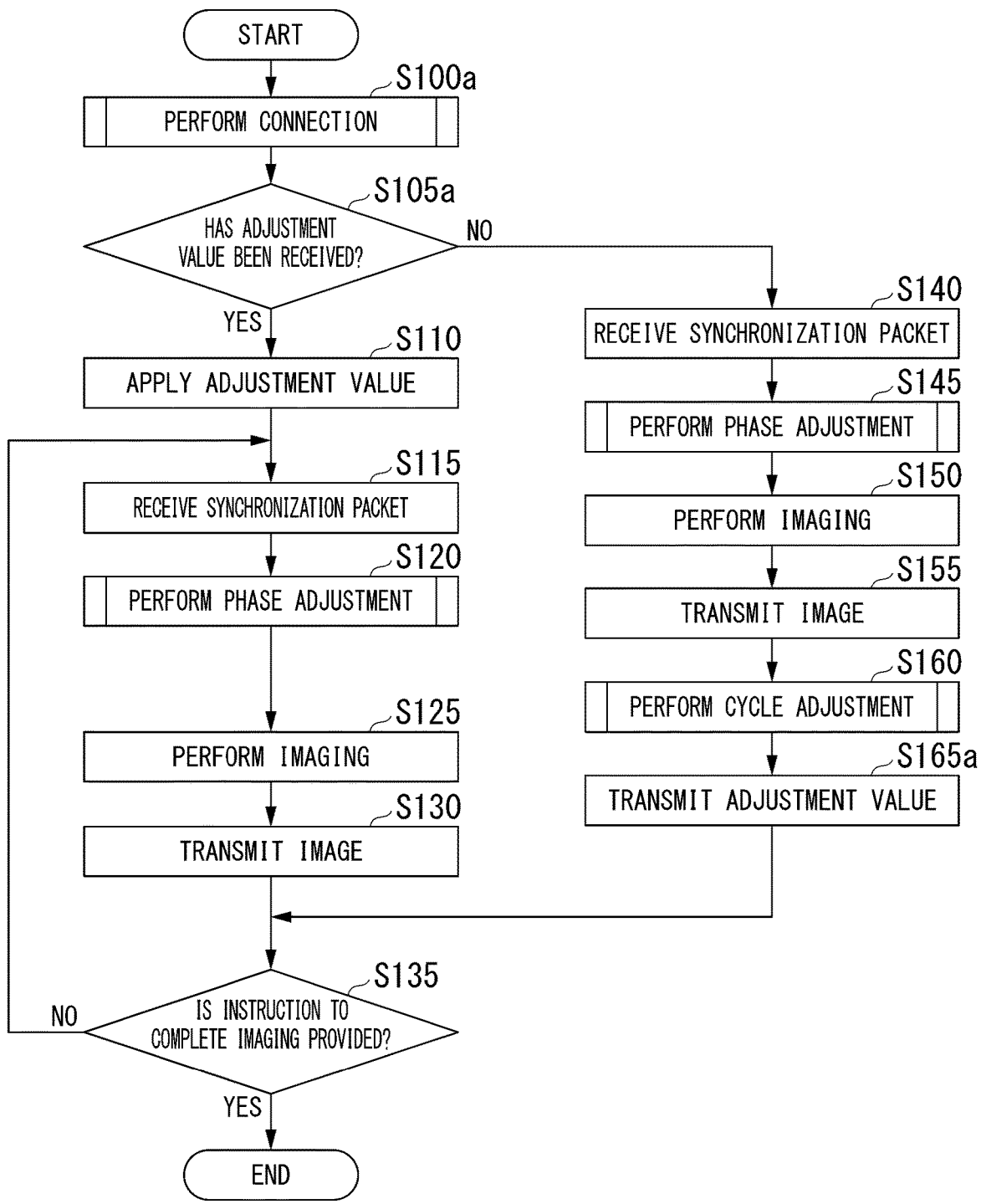
FIG. 13 is a flow chart showing a procedure of an operation of the transmission terminal according to the modified example of the first embodiment of the present invention.

An operation of the transmission terminal 100a will be described. FIG. 13 shows a procedure of the operation of the transmission terminal 100a. The same processing as that shown in FIG. 4 will not be described.

The processor 132a executes connection processing (Step S100a). The connection processing is the same as that shown in FIG. 7 except for Step S1000 shown in FIG. 7. The processor 132a transmits the identification information of the communicator 140 to the communicator 210 of the reception terminal 200a by using the communicator 140 in Step S1000.

After the connection processing is executed, the communicator 210 of the reception terminal 200a transmits an adjustment value to the communicator 140. When the adjustment value is transmitted from the communicator 210, the communicator 140 receives the adjustment value. After Step S100a, the processor 132a determines whether or not the adjustment value has been received (Step S105a). For example, the processor 132a determines in Step S105a whether or not the adjustment value is received within a predetermined time from the timing at which the connection processing is executed. When the processor 132a determines that the adjustment value has been received in Step S105a, Step S110 is executed.

The processor 132a adjusts the cycle of the Vsync for imaging by applying the adjustment value received from the communicator 210 to the signal generator 131 in Step S110. When the processor 132a determines that the adjustment value has not been received in Step S105a, Step S140 is executed.

After Step S160, the processor 132a transmits the adjustment value calculated in Step S160 to the communicator 210 by using the communicator 140 (Step S165a). After Step S165a, Step S135 is executed.

In the above-described example, the communicator 140 transmits the identification information to the communicator

210. A communication method of the identification information is not limited to this. For example, the transmission terminal 100*a* may include two or more communicators including the communicator 140, and the reception terminal 200*a* may include two or more communicators including the communicator 210. A communicator of the transmission terminal 100*a* other than the communicator 140 may transmit the identification information of the communicator 140 to a communicator of the reception terminal 200*a* other than the communicator 210. In other words, the transmission terminal 100*a* may transmit the identification information to the reception terminal 200*a* by using a communicator other than the communicator 140 used for transmitting an image.

In the above-described example, the communicator 140 receives the adjustment value from the communicator 210 in Step S105*a*. A communication method of the adjustment value is not limited to this. In a case in which the transmission terminal 100*a* includes two or more communicators and the reception terminal 200*a* includes two or more communicators, a communicator of the transmission terminal 100*a* other than the communicator 140 may receive the adjustment value from a communicator of the reception terminal 200*a* other than the communicator 210 in Step S105*a*. In other words, the transmission terminal 100*a* may receive the adjustment value from the reception terminal 200*a* by using a communicator other than the communicator 140 used for transmitting an image.

In the above-described example, the communicator 140 transmits the adjustment value to the communicator 210 in Step S165*a*. A communication method of the adjustment value is not limited to this. In a case in which the transmission terminal 100*a* includes two or more communicators and the reception terminal 200*a* includes two or more communicators, a communicator of the transmission terminal 100*a* other than the communicator 140 may transmit the adjustment value to a communicator of the reception terminal 200*a* other than the communicator 210 in Step S165*a*. In other words, the transmission terminal 100*a* may transmit the adjustment value to the reception terminal 200*a* by using a communicator other than the communicator 140 used for transmitting an image.

Figure 14:
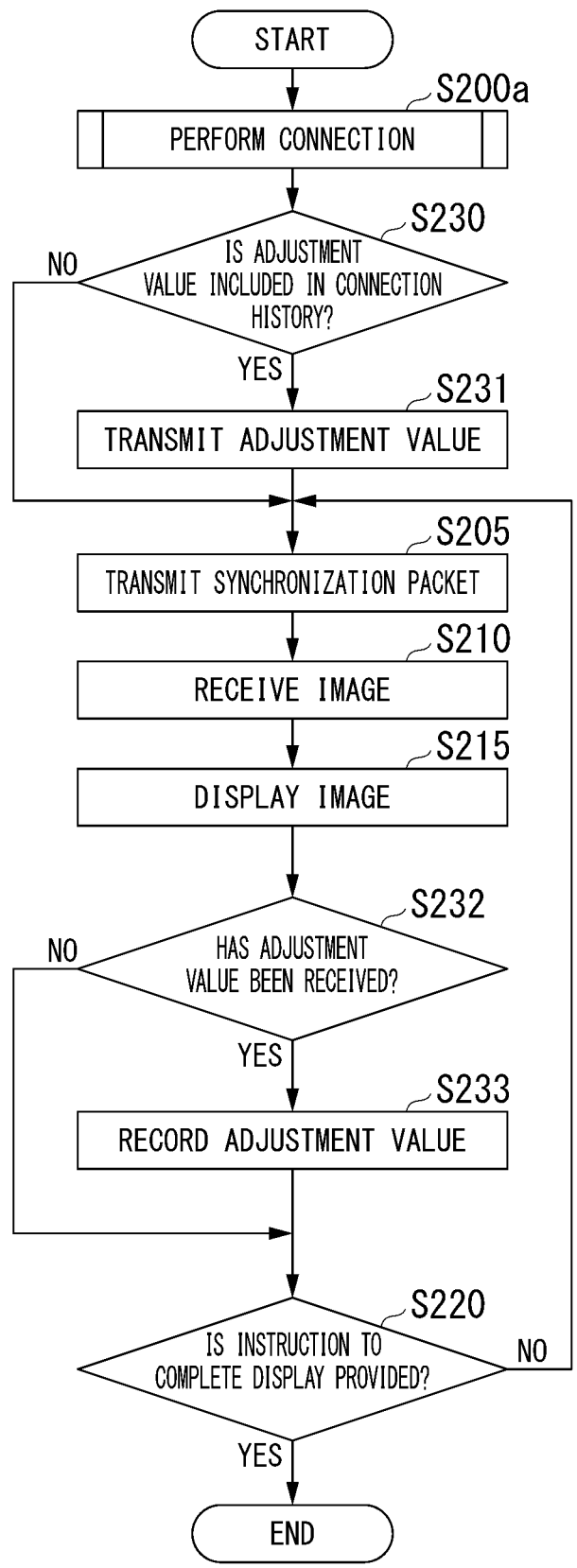
FIG. 14 is a flow chart showing a procedure of an operation of the reception terminal according to the modified example of the first embodiment of the present invention.

An operation of the reception terminal 200*a* will be described. FIG. 14 shows a procedure of the operation of the reception terminal 200*a*. The same processing as that shown in FIG. 6 will not be described.

The processor 232 executes connection processing (Step S200*a*). The connection processing is the same as that shown in FIG. 10 except for Step S2000 shown in FIG. 10. The processor 232 receives the identification information of the communicator 140 of the transmission terminal 100*a* from the communicator 140 by using the communicator 210 in Step S2000.

After Step S200*a*, the processor 232 determines whether or not the identification information received from the communicator 140 is included in the connection history recorded on the recording medium 250. In this way, the processor 232 determines whether or not the adjustment value is included in the connection history (Step S230). When the communicator 140 and the communicator 210 connect to each other for the first time, the adjustment value and the identification information of the communicator 140 are not included in the connection history. When the identification information is not included in the connection history, the processor 232 determines that the adjustment value is not included in the connection history. When the communicator 140 and the communicator 210 have a history of connecting to each other and the communicator 140 and the communicator 210 connect to each other again, the adjustment value and the identification information of the communicator 140 are included in the connection history. When the identification information is included in the connection history, the processor 232 determines that the adjustment value is included in the connection history.

When the processor 232 determines that the adjustment value is included in the connection history in Step S230, the processor 232 reads the adjustment value associated with the identification information received from the communicator 140 in the connection history from the recording medium 250. The processor 232 transmits the adjustment value to the communicator 140 by using the communicator 210 (Step S231). After Step S231, Step S205 is executed. When the processor 232 determines that the adjustment value is not included in the connection history in Step S230, Step S205 is executed.

When the adjustment value is transmitted from the communicator 140, the communicator 210 receives the adjustment value. After Step S215, the processor 232 determines whether or not the adjustment value has been received (Step S232). When the processor 232 determines that the adjustment value has not been received in Step S232, Step S220 is executed.

When the processor 232 determines that the adjustment value has been received in Step S232, the processor 232 associates the adjustment value received from the communicator 140 and the identification information of the communicator 140 with each other. The processor 232 records the connection history including the adjustment value and the identification information on the recording medium 250 (Step S233). After Step S233, Step S220 is executed.

In the above-described example, the communicator 210 receives the identification information of the communicator 140 from the communicator 140. In a case in which the transmission terminal 100*a* includes two or more communicators and the reception terminal 200*a* includes two or more communicators, a communicator of the reception terminal 200*a* other than the communicator 210 may receive the identification information of the communicator 140 from a communicator of the transmission terminal 100*a* other than the communicator 140. In other words, the reception terminal 200*a* may receive the identification information from the transmission terminal 100*a* by using a communicator other than the communicator 210 used for receiving an image.

In the above-described example, the communicator 210 transmits the adjustment value to the communicator 140 in Step S231. In a case in which the transmission terminal 100*a* includes two or more communicators and the reception terminal 200*a* includes two or more communicators, a communicator of the reception terminal 200*a* other than the communicator 210 may transmit the adjustment value to a communicator of the transmission terminal 100*a* other than the communicator 140 in Step S231. In other words, the reception terminal 200*a* may transmit the adjustment value to the transmission terminal 100*a* by using a communicator other than the communicator 210 used for receiving an image.

In the above-described example, the communicator 210 receives the adjustment value from the communicator 140 in Step S232. In a case in which the transmission terminal 100*a* includes two or more communicators and the reception terminal 200*a* includes two or more communicators, a communicator of the reception terminal 200*a* other than the communicator 210 may receive the adjustment value from a communicator of the transmission terminal 100*a* other than the communicator 140 in Step S232. In other words, the reception terminal 200a may receive the adjustment value from the transmission terminal 100a by using a communicator other than the communicator 210 used for receiving an image.

Each of the timing of transmitting the adjustment value in Step S165a and the timing of receiving the adjustment value in Step S232 is not limited to that shown in each of FIG. 13 and FIG. 14. For example, communication of the adjustment value may be performed on a regular basis. After a predetermined time has passed from the timing at which the Vsync for imaging of the transmission terminal 100a is adjusted, communication of the adjustment value may be performed. After an instruction to complete imaging is provided, communication of the adjustment value may be performed. Before the connection between the communicator 140 and the communicator 210 is cut off, communication of the adjustment value may be performed.

In the modified example of the first embodiment, when the communicator 140 and the communicator 210 connect to each other again, the processor 232 of the reception terminal 200a determines whether or not the identification information of the communicator 140 is recorded on the recording medium 250. When the identification information of the communicator 140 is recorded on the recording medium 250, the processor 232 transmits the adjustment information associated with the identification information in the connection history to the communicator 140 by using the communicator 210. The processor 132a of the transmission terminal 100a adjusts the signal generator 131 on the basis of the adjustment value indicated by the adjustment information received from the communicator 210. In this case, the processor 132a does not need to execute Step S160 shown in FIG. 4. Therefore, the communication system 10 can cause the cycle of the synchronization signal of the transmission terminal 100a and the cycle of the synchronization signal of the reception terminal 200a to match each other in a short period of time. There is a possibility that the original oscillation clock of the transmission terminal 100a and the original oscillation clock of the reception terminal 200a change in accordance with the temperature and aging of the terminal. Therefore, the cycle adjustment may be performed between the transmission terminal 100a and the reception terminal 200a every predetermined period, and the adjustment value recorded on the recording medium 250 may be rewritten so as to update the adjustment value. Even when the original oscillation clock of the transmission terminal 100a or the reception terminal 200a changes, the operation of the cycle adjustment shown in the first embodiment is available.

Second Embodiment

Figure 15:
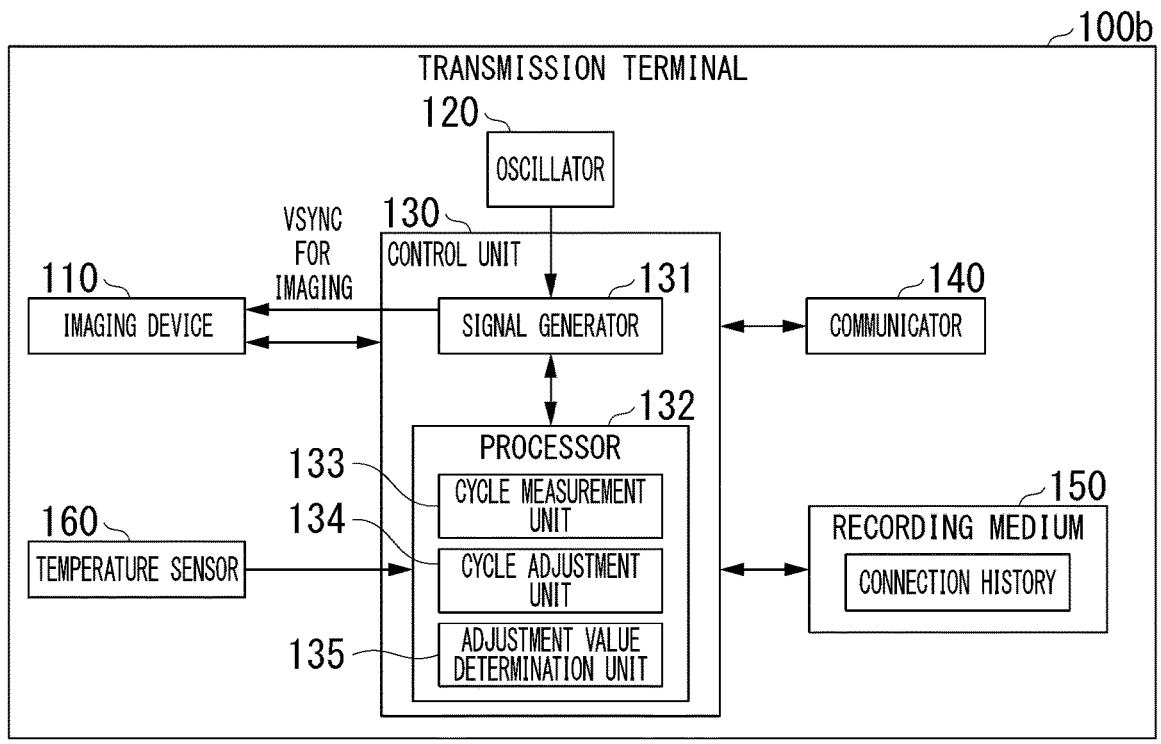
FIG. 15 is a block diagram showing a configuration of a transmission terminal according to a second embodiment of the present invention.

A second embodiment of the present invention will be described. In the second embodiment, the adjustment value for adjusting the cycle of the Vsync for imaging is corrected in accordance with the temperature. The transmission terminal 100 shown in FIG. 2 is changed to a transmission terminal 100b shown in FIG. 15. FIG. 15 shows a configuration of the transmission terminal 100b. The same configuration as that shown in FIG. 2 will not be described.

The transmission terminal 100b includes a temperature sensor 160 (first temperature sensor) in addition to the configuration shown in FIG. 2. For example, the temperature sensor 160 includes a thermistor. The temperature sensor 160 is disposed close to the oscillator 120. The temperature sensor 160 may be in contact with the oscillator 120. The temperature sensor 160 measures the temperature of the oscillator 120 and outputs a signal indicating the temperature to the processor 132.

Figure 16:
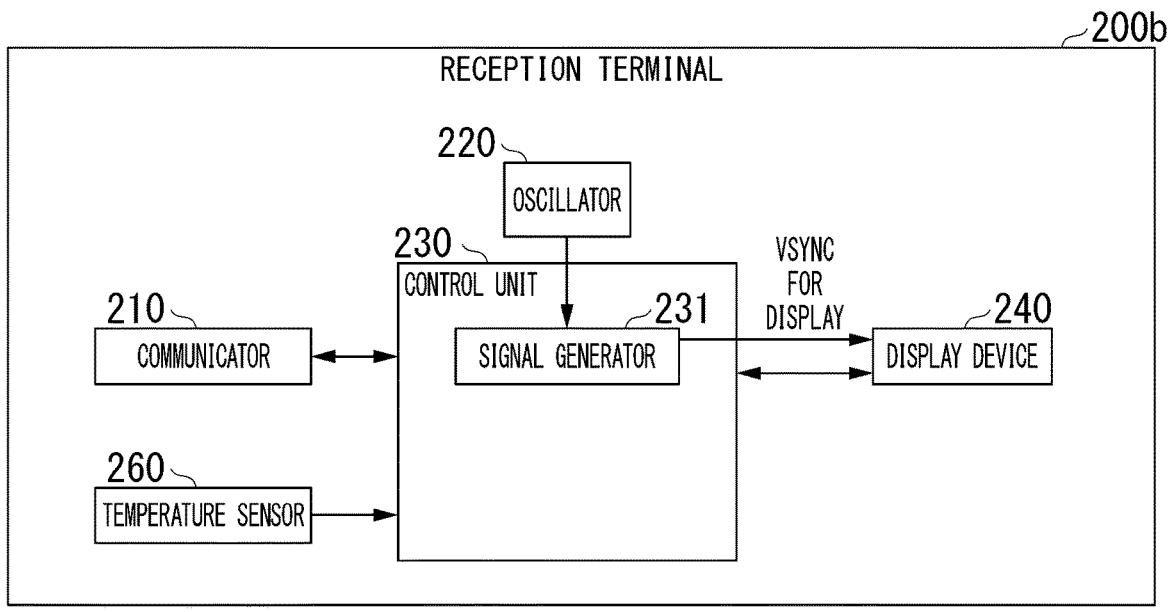
FIG. 16 is a block diagram showing a configuration of a reception terminal according to the second embodiment of the present invention.

The reception terminal 200 shown in FIG. 3 is changed to a reception terminal 200b shown in FIG. 16. FIG. 16 shows a configuration of the reception terminal 200b. The same configuration as that shown in FIG. 3 will not be described.

The reception terminal 200b includes a temperature sensor 260 (second temperature sensor) in addition to the configuration shown in FIG. 3. For example, the temperature sensor 260 includes a thermistor. The temperature sensor 260 is disposed close to the oscillator 220. The temperature sensor 260 may be in contact with the oscillator 220. The temperature sensor 260 measures the temperature of the oscillator 220 and outputs a signal indicating the temperature to the control unit 230.

Each time the communicator 140 and the communicator 210 connect to each other, the processor 132 of the transmission terminal 100b acquires temperature information indicating the temperature measured by the temperature sensor 260 of the reception terminal 200b. In the second embodiment, the communicator 210 transmits the temperature information to the communicator 140. The processor 132 receives the temperature information from the communicator 210 by using the communicator 140. When the processor 132 calculates the adjustment value, the processor 132 records the connection history on the recording medium 150. In the connection history, the temperature measured by the temperature sensor 160, the temperature measured by the temperature sensor 260, the adjustment information indicating the adjustment value, and the identification information indicating the communicator 210 are associated with each other.

When the communicator 140 and the communicator 210 connect to each other again, if the identification information corresponding to one of the communicator 140 and the communicator 210 is recorded on the recording medium 150, the processor 132 determines whether or not to correct the adjustment value on the basis of the temperature measured by each of the temperature sensor 160 and the temperature sensor 260 and the temperature associated with the identification information in the connection history. In the following example, if the identification information of the communicator 210 is recorded on the recording medium 150, the processor 132 determines whether or not to correct the adjustment value.

When the processor 132 determines to correct the adjustment value, the processor 132 corrects the adjustment value indicated by the adjustment information associated with the identification information in the connection history on the basis of the temperature characteristics of the original oscillation clock of each of the first synchronization signal (Vsync for imaging) and the second synchronization signal (Vsync for display). The processor 132 adjusts the signal generator 131 on the basis of the corrected adjustment value.

Figures 17, 18:
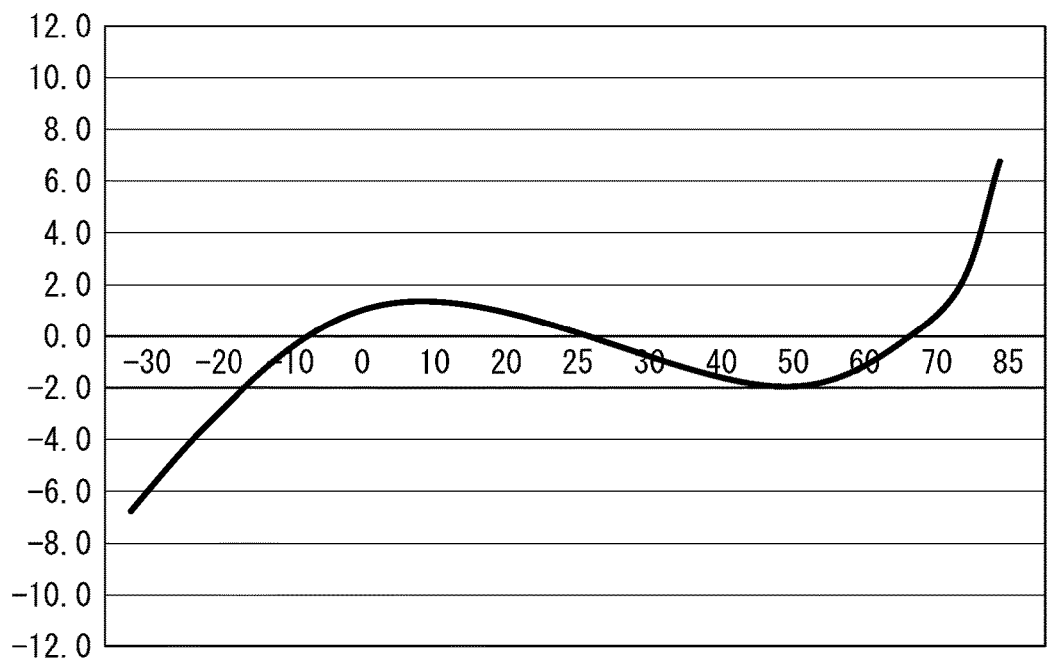
FIG. 17 is a graph showing a relationship between a temperature and an oscillation cycle of an original oscillation clock in the second embodiment of the present invention.
FIG. 18 is a diagram showing a connection history in the second embodiment of the present invention.

FIG. 17 shows a graph indicating a relationship between a temperature and an oscillation cycle of an original oscillation clock. The horizontal axis in FIG. 17 indicates a temperature [degree centigrade], and the vertical axis in FIG. 17 indicates the oscillation cycle [ppm] of the original oscillation clock. The graph shown in FIG. 17 indicates the temperature characteristics of the original oscillation clock. For example, when the temperature changes from 25 degrees centigrade to 50 degrees centigrade, a deviation of −2.0 ppm occurs for the oscillation cycle at 25 degrees centigrade. The temperature characteristics of the oscillation cycle of the original oscillation clock may be different between the oscillator 120 and the oscillator 220. A table indicating a relationship between the temperature and the oscillation cycle of the original oscillation clock in each of the oscillator 120 and the oscillator 220 is recorded on the recording medium 150.

FIG. 18 shows an example of the connection history recorded on the recording medium 150. In the connection history, the identification information, the adjustment value, the temperature of the transmission terminal 100b, and the temperature of the reception terminal 200b are associated with each other. The temperature of the transmission terminal 100b indicates the temperature measured by the temperature sensor 160. The temperature of the reception terminal 200b indicates the temperature measured by the temperature sensor 260.

Figure 19:
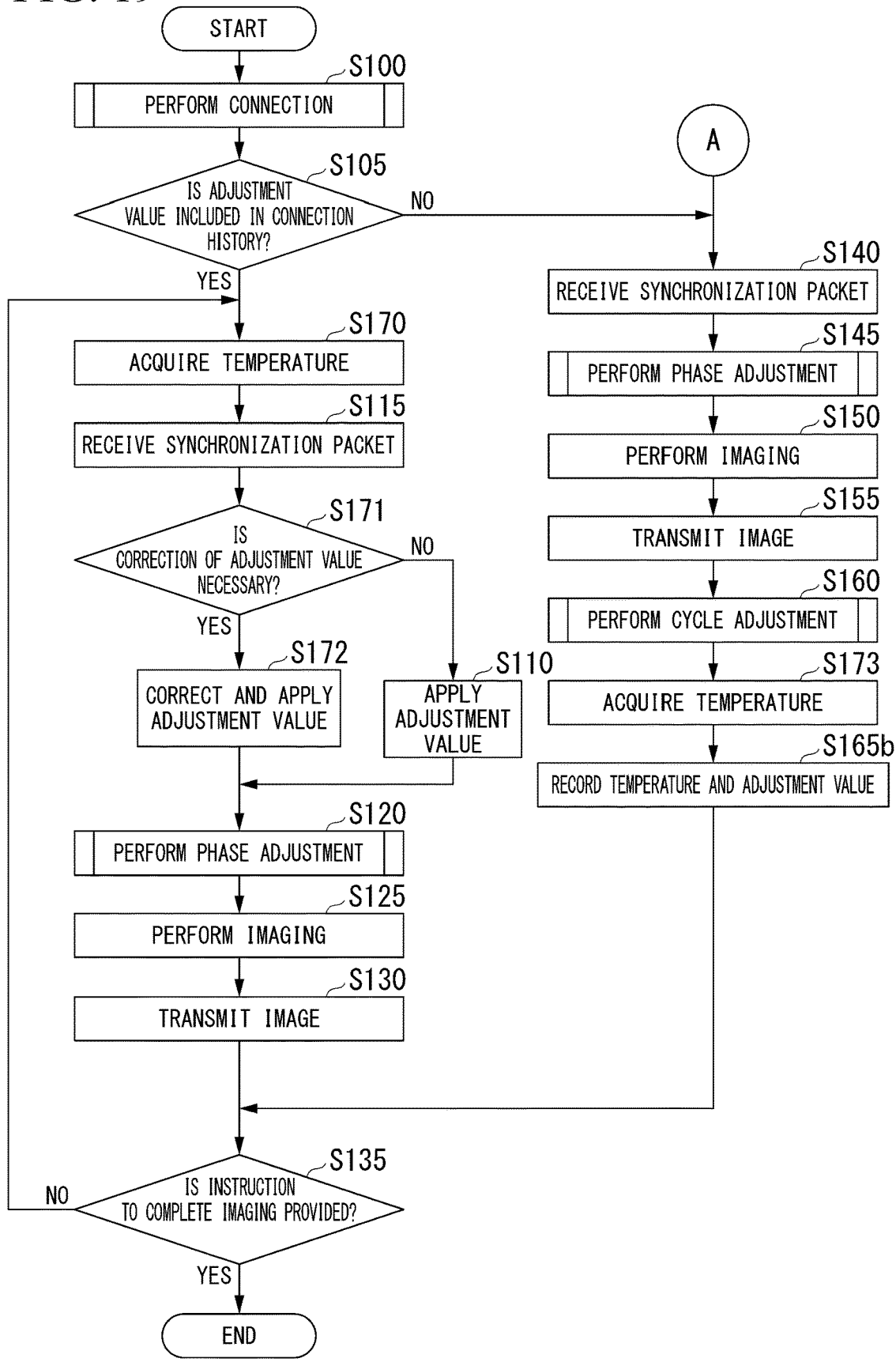
FIG. 19 is a flow chart showing a procedure of an operation of the transmission terminal according to the second embodiment of the present invention.

An operation of the transmission terminal 100b will be described. FIG. 19 shows a procedure of the operation of the transmission terminal 100b. The same processing as that shown in FIG. 4 will not be described.

When the processor 132 determines that the adjustment value is included in the connection history in Step S105, the processor 132 acquires the temperature from the temperature sensor 160 (Step S170). After Step S170, Step S115 is executed.

The processor 132 receives a synchronization packet from the communicator 210 by using the communicator 140 in Step S115. The synchronization packet includes temperature information indicating the temperature measured by the temperature sensor 260 of the reception terminal 200b. After Step S115, the processor 132 determines whether or not correction of the adjustment value is necessary on the basis of the temperature measured by each of the temperature sensor 160 and the temperature sensor 260 and the temperature associated with the identification information received from the communicator 210 in the connection history (Step S171).

Details of the processing executed by the processor 132 in Step S171 will be described. The processor 132 calculates, for each terminal, the difference in the oscillation cycle generated on the basis of the difference between the temperature in previous connection and the temperature in current connection. Specifically, the processor 132 uses the temperature of the transmission terminal 100b in the connection history, the temperature acquired in Step S170, and the temperature characteristics of the oscillation cycle of the original oscillation clock in the oscillator 120. For example, the temperature characteristics of the oscillation cycle of the original oscillation clock in the oscillator 120 are similar to those in the graph shown in FIG. 17. The processor 132 calculates a difference $\Delta CNT\_A\_T$ in the oscillation cycle of the original oscillation clock in the oscillator 120.

An example in which the temperature of the transmission terminal 100b in the connection history is 25 degrees centigrade and the temperature acquired in Step S170 is 30 degrees centigrade will be described. In the graph shown in FIG. 17, the oscillation cycle at a temperature of 25 degrees centigrade is 0 ppm, and the oscillation cycle at a temperature of 30 degrees centigrade is −1.0 ppm. The difference $\Delta CNT\_A\_T$ is −1.0 ppm.

The processor 132 executes similar processing to that described above by using information of the reception terminal 200b. Specifically, the processor 132 uses the temperature of the reception terminal 200b in the connection history, the temperature indicated by the temperature information included in the synchronization packet, and the temperature characteristics of the oscillation cycle of the original oscillation clock in the oscillator 220. The processor 132 calculates a difference $\Delta CNT\_B\_T$ in the oscillation cycle of the original oscillation clock in the oscillator 220.

The processor 132 calculates a difference $\Delta CNT$ ($\Delta CNT\_A\_T - \Delta CNT\_B\_T$) between the difference $\Delta CNT\_A\_T$ and the difference $\Delta CNT\_B\_T$. The processor 132 determines whether or not the absolute value of the difference $\Delta CNT$ is greater than a predetermined value. When the absolute value of the difference $\Delta CNT$ is greater than the predetermined value, the processor 132 determines that the correction of the adjustment value is necessary. When the absolute value of the difference $\Delta CNT$ is less than or equal to the predetermined value, the processor 132 determines that the correction of the adjustment value is unnecessary.

When the processor 132 determines that the correction of the adjustment value is unnecessary in Step S171, Step S110 is executed. When the processor 132 determines that the correction of the adjustment value is necessary in Step S171, the processor 132 reads the adjustment value associated with the identification information in the connection history from the recording medium 150 and corrects the adjustment value. The processor 132 adjusts the cycle of the Vsync for imaging by applying the corrected adjustment value to the signal generator 131 (Step S172). After Step S172, Step S120 is executed.

Details of the processing executed in Step S172 by the processor 132 will be described. The processor 132 reads the adjustment value associated with the identification information in the connection history from the recording medium 150. The processor 132 corrects the adjustment value on the basis of the difference $\Delta CNT$. For example, when the difference $\Delta CNT$ is +10 ppm, the oscillation cycle of the original oscillation clock in the oscillator 120 is longer than that of the original oscillation clock in the oscillator 220. In this case, the processor 132 reduces the adjustment value (positive adjustment value or negative adjustment value) by a value corresponding to +10 ppm in order to shorten the cycle of the Vsync for imaging. When the difference $\Delta CNT$ is −10 ppm, the oscillation cycle of the original oscillation clock in the oscillator 120 is shorter than that of the original oscillation clock in the oscillator 220. In this case, the processor 132 increases the adjustment value (positive adjustment value or negative adjustment value) by a value corresponding to −10 ppm in order to lengthen the cycle of the Vsync for imaging.

After the adjustment value is corrected, the processor 132 adjusts the cycle of the Vsync for imaging on the basis of the corrected adjustment value. A method of adjusting the cycle of the Vsync for imaging is similar to that of adjusting the cycle of the Vsync for imaging in Step S110.

After Step S160, the processor 132 acquires the temperature from the temperature sensor 160 (Step S173). After Step S173, the processor 132 associates the identification information of the communicator 210, the adjustment value calculated in Step S160, the temperature acquired in Step S173, and the temperature of the reception terminal 200b with each other. The temperature of the reception terminal 200b is indicated by the temperature information included in the synchronization packet received in Step S140. The processor 132 records the connection history including the identification information, the adjustment value, and the temperature of each terminal on the recording medium 150 (Step S165b). After Step S165b, Step S135 is executed.

In the above-described example, the communicator 140 receives the temperature information from the communicator 210. A communication method of the temperature information is not limited to this. For example, the transmission terminal 100b may include two or more communicators including the communicator 140, and the reception terminal 200b may include two or more communicators including the communicator 210. A communicator of the transmission terminal 100b other than the communicator 140 may receive the temperature information from a communicator of the reception terminal 200b other than the communicator 210. In other words, the transmission terminal 100b may receive the temperature information from the reception terminal 200b by using a communicator other than the communicator 140 used for transmitting an image.

Figure 20:
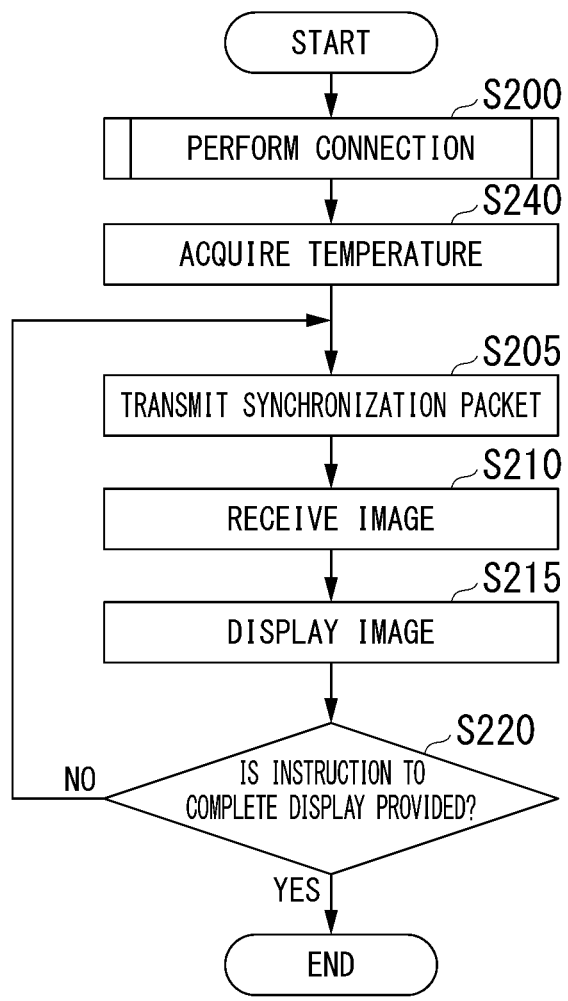
FIG. 20 is a flow chart showing a procedure of an operation of the reception terminal according to the second embodiment of the present invention.

An operation of the reception terminal 200b will be described. FIG. 20 shows a procedure of the operation of the reception terminal 200b. The same processing as that shown in FIG. 6 will not be described.

After Step S200, the control unit 230 acquires the temperature from the temperature sensor 260 (Step S240). After Step S240, Step S205 is executed. The communicator 210 transmits a synchronization packet to the communicator 140 of the transmission terminal 100b in Step S205. The synchronization packet includes temperature information indicating the temperature acquired in step S240.

In the above-described example, the communicator 210 transmits the temperature information to the communicator 140. In a case in which the transmission terminal 100b includes two or more communicators and the reception terminal 200b includes two or more communicators, a communicator of the reception terminal 200b other than the communicator 210 may transmit the temperature information to a communicator of the transmission terminal 100b other than the communicator 140. In other words, the reception terminal 200b may transmit the temperature information to the transmission terminal 100b by using a communicator other than the communicator 210 used for receiving an image.

The temperature sensor 160 and the temperature sensor 260 measure the temperature on a regular basis. In the above-described example, the temperature sensor 160 and the temperature sensor 260 measure the temperature in each frame period. The temperature sensor 160 and the temperature sensor 260 may measure the temperature at intervals, each of which is shorter or longer than one frame period.

In the second embodiment, the processor 132 corrects the adjustment value on the basis of the temperature characteristics of the original oscillation clock and adjusts the signal generator 131 on the basis of the corrected adjustment value. Therefore, even when the oscillation cycle of the original oscillation clock changes in accordance with the temperature, the communication system 10 can cause the cycle of the synchronization signal of the transmission terminal 100b and the cycle of the synchronization signal of the reception terminal 200b to match each other in a short period of time.

Third Embodiment

Figure 21:
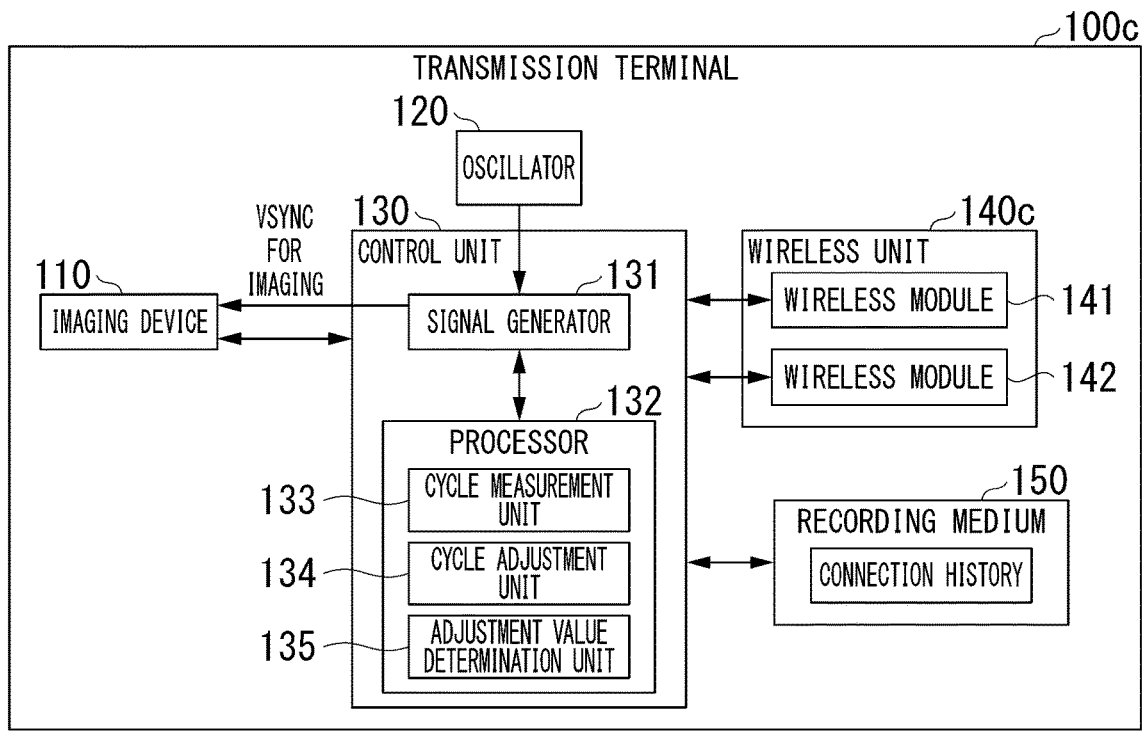
FIG. 21 is a block diagram showing a configuration of a transmission terminal according to a third embodiment of the present invention.

A third embodiment of the present invention will be described. In the third embodiment, the transmission terminal and the reception terminal perform wireless communication. The transmission terminal 100 shown in FIG. 2 is changed to a transmission terminal 100c shown in FIG. 21. FIG. 21 shows a configuration of the transmission terminal 100c. The same configuration as that shown in FIG. 2 will not be described.

In the transmission terminal 100c, the communicator 140 shown in FIG. 2 is changed to a wireless unit 140c. The wireless unit 140c includes one or more wireless modules (first wireless modules). In the example shown in FIG. 21, the wireless unit 140c includes a wireless module 141 and a wireless module 142. Each of the wireless modules has a MAC address unique to each of the wireless modules.

Figure 22:
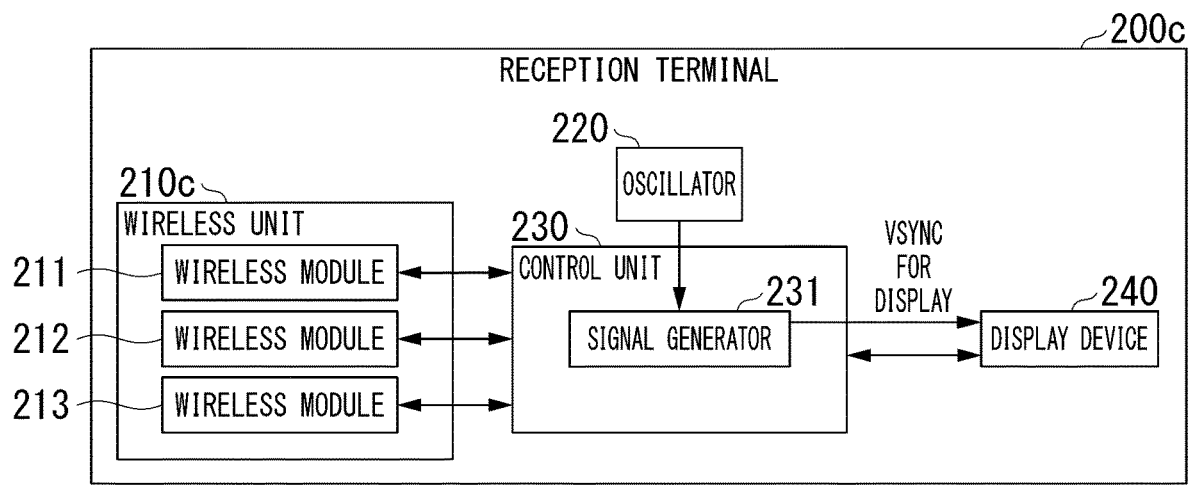
FIG. 22 is a block diagram showing a configuration of a reception terminal according to the third embodiment of the present invention.

The reception terminal 200 shown in FIG. 3 is changed to a reception terminal 200c shown in FIG. 22. FIG. 22 shows a configuration of the reception terminal 200c. The same configuration as that shown in FIG. 3 will not be described.

In the reception terminal 200c, the communicator 210 shown in FIG. 3 is changed to a wireless unit 210c. The wireless unit 210c includes two or more wireless modules (second wireless modules). In the example shown in FIG. 22, the wireless unit 210c includes a wireless module 211, a wireless module 212, and a wireless module 213. Each of the wireless modules has a MAC address unique to each of the wireless modules.

Each of the wireless modules of the wireless unit 140c and each of the wireless modules of the wireless unit 210c perform wireless communication. The identification information in the third embodiment is a MAC address of the wireless module included in the wireless unit 210c. In the connection history recorded on the recording medium 150, the identification information of each of the wireless module 211, the wireless module 212, and the wireless module 213 is associated with the adjustment information indicating the adjustment value.

As the communication standards of each of the wireless modules, a wireless LAN such as 802.11a/b/g/n/ac is used. Each of the wireless modules of the wireless unit 210c functions as an access point (AP) and starts connection by using one of independent channels. For example, a channel belonging to any one of W52, W53, and W56 is used. Each of the wireless modules of the wireless unit 140c functions as a station (STA). One of the wireless module 141 and the wireless module 142 transmits an image by using a main channel, and the other of the wireless module 141 and the wireless module 142 only establishes link connection by using a sub-channel.

The number of wireless modules included in the wireless unit 140c is not limited to two, and the number of wireless modules included in the wireless unit 210c is not limited to three. The wireless unit 140c may include three or more wireless modules. The wireless unit 210c may include two wireless modules or may include four or more wireless modules. In a case in which both the wireless unit 140c and the wireless unit 210c include one wireless module, similar processing to that in the first embodiment is executed.

Figure 23:
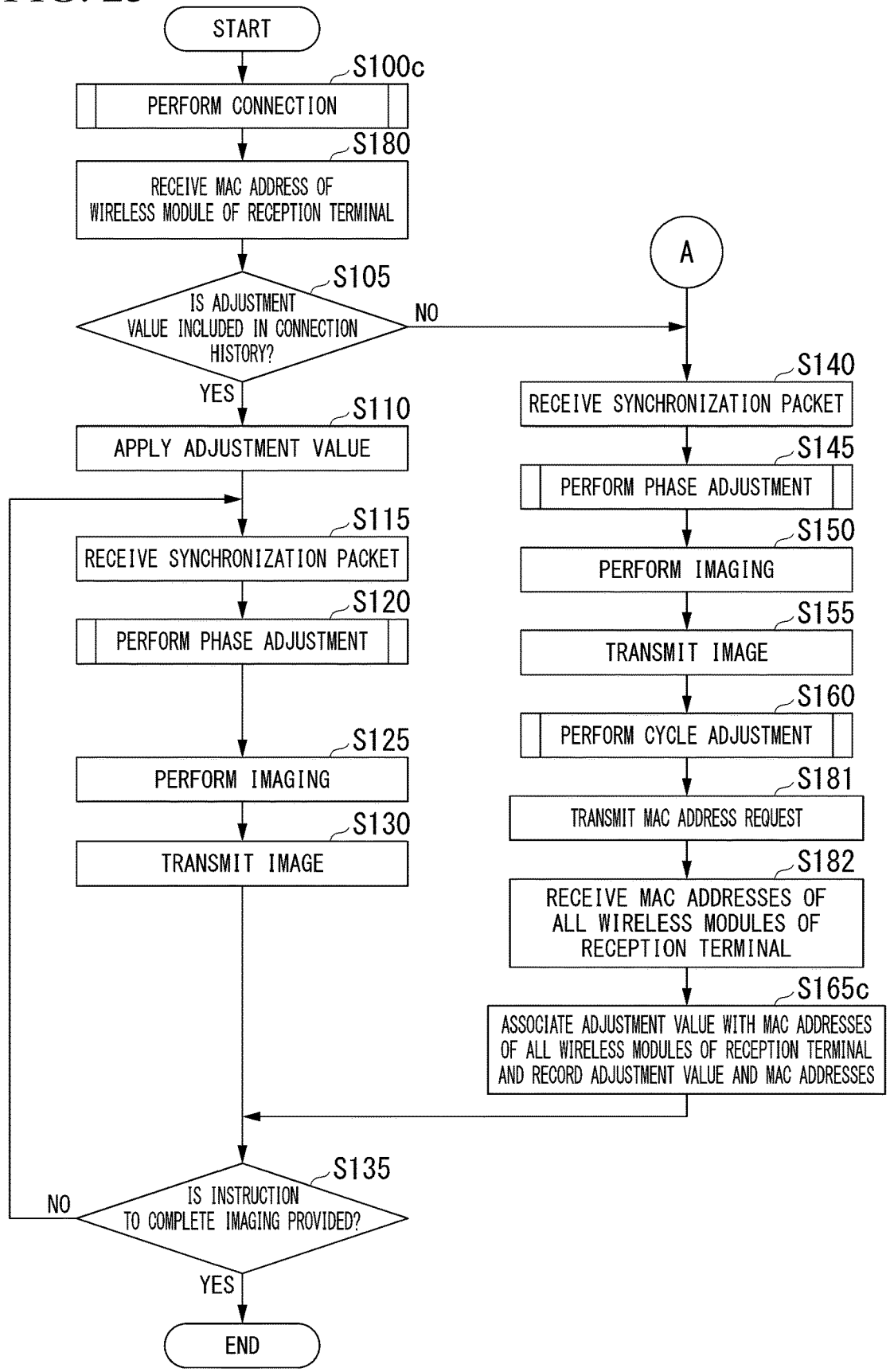
FIG. 23 is a flow chart showing a procedure of an operation of the transmission terminal according to the third embodiment of the present invention.

An operation of the transmission terminal 100c will be described. FIG. 23 shows a procedure of the operation of the transmission terminal 100c. The same processing as that shown in FIG. 4 will not be described.

Figures 24, 25:
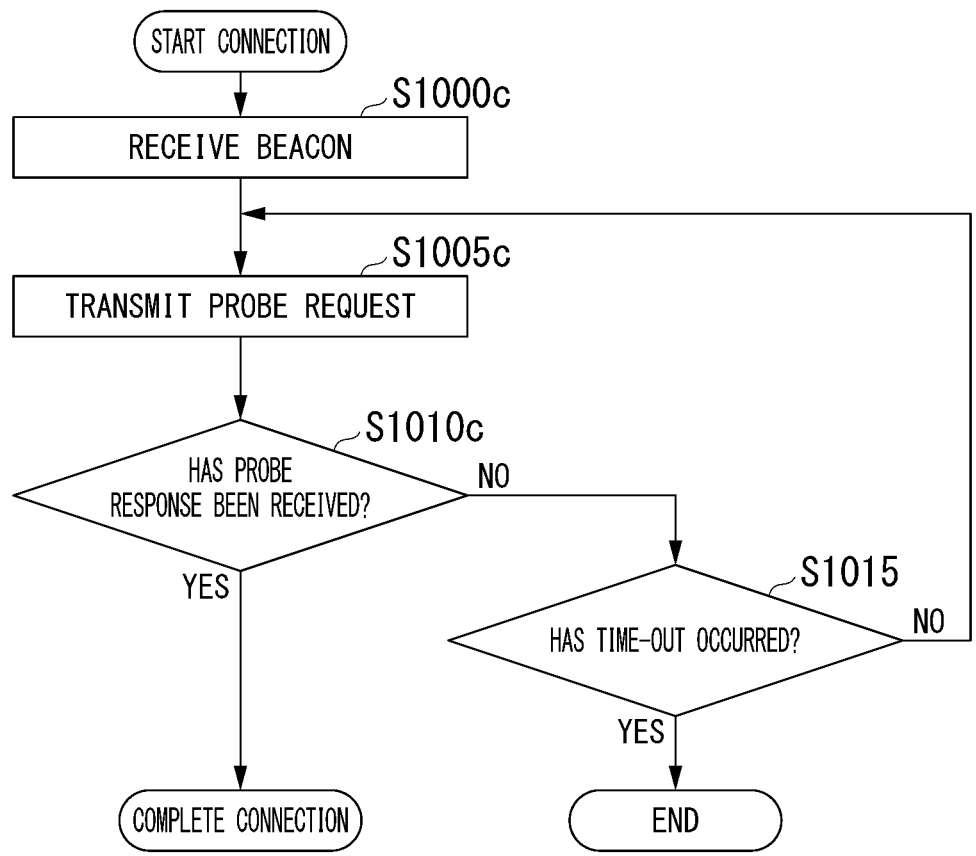
FIG. 24 is a flow chart showing a procedure of an operation of the transmission terminal according to the third embodiment of the present invention.
FIG. 25 is a diagram showing a connection history in the third embodiment of the present invention.

The processor 132 executes connection processing (Step S100c). The connection processing in the third embodiment is different from that in the first embodiment. The connection processing (Step S100c) executed in the transmission terminal 100c will be described. FIG. 24 shows a procedure of an operation of the transmission terminal 100c in the connection processing.

The wireless unit 140c waits in order to receive a beacon transmitted from one of the wireless modules of the wireless unit 210c of the reception terminal 200c. When the beacon is transmitted from the wireless unit 210c, one of the wireless modules of the wireless unit 140c receives the beacon (Step S1000c).

After Step S1000c, the processor 132 transmits a connection request (probe request) to one of the wireless modules of the wireless unit 210c by using one of the wireless modules of the wireless unit 140c (Step S1005c). One of the wireless modules of the wireless unit 210c receives the connection request and transmits a connection confirmation (probe response) to one of the wireless modules of the wireless unit 140c.

When the connection confirmation is transmitted from the wireless unit 210c, one of the wireless modules of the wireless unit 140c receives the connection confirmation. The processor 132 determines whether or not the connection confirmation has been received (Step S1010c). For example, the processor 132 determines in Step S1010c whether or not the connection confirmation is received within a predetermined time from the timing at which the connection request is transmitted.

When the processor 132 determines that the connection confirmation has been received in Step S1010c, the processing shown in FIG. 24 is completed and Step S180 shown in FIG. 23 is executed. In this case, the connection between one of the wireless modules of the wireless unit 140c and one of the wireless modules of the wireless unit 210c is established. The wireless unit 140c and the wireless unit 210c can perform communication of an image.

The wireless module 141 and the wireless module 142 of the wireless unit 140c may execute the connection processing independently of each other. The connection relationship between the wireless unit 140c and the wireless unit 210c is arbitrary. The wireless module 141 is connected to any one of the three wireless modules of the wireless unit 210c, and the wireless module 142 is connected to any one of the three wireless modules of the wireless unit 210c. The wireless module 141 and the wireless module 142 do not connect to the same wireless module at the same time.

When the processor 132 determines that the connection confirmation has not been received in Step S1010c, the processor 132 determines whether or not a time-out has occurred (Step S1015). Step S1015 is the same as that shown in FIG. 7.

When the processor 132 determines that the time-out has occurred in Step S1015, the processing shown in FIG. 23 and FIG. 24 is completed. When the processor 132 determines that the time-out has not occurred in Step S1015, Step S1005c is executed.

The operation of the transmission terminal 100c shown in FIG. 23 will be described again. When the processor 132 determines that the connection confirmation has been received in Step S1010c shown in FIG. 24, one of the wireless modules of the wireless unit 140c receives the MAC address of one of the wireless modules of the wireless unit 210c used for communication of the adjustment value from one of the wireless modules of the wireless unit 210c. The processor 132 acquires the received MAC address from the wireless unit 140c (Step S180). The wireless module used for communication of the MAC address in Step S180 may be the same as or different from that used for communication of an image in Step S155. After Step S180, Step S105 is executed. The processor 132 uses the MAC address as the identification information in Step S105.

After Step S160, the processor 132 transmits a MAC address request to one of the wireless modules of the wireless unit 210c by using one of the wireless modules of the wireless unit 140c (Step S181). The MAC address request indicates a request for all the MAC addresses of the three wireless modules of the wireless unit 210c. The wireless module used for communication of the MAC address request in Step S181 may be the same as or different from that used for communication of an image in Step S155.

After Step S181, one of the wireless modules of the wireless unit 140c receives all the MAC addresses of the three wireless modules of the wireless unit 210c from one of the wireless modules of the wireless unit 210c. The processor 132 acquires the received MAC address from the wireless unit 140c (Step S182). The wireless module used in Step S182 is the same as that used in Step S181.

After Step S182, the processor 132 associates the adjustment value calculated in Step S160 and all the MAC addresses of the three wireless modules of the wireless unit 210c with each other. The processor 132 records the connection history including the adjustment value and the MAC addresses on the recording medium 150 (Step S165c). After Step S165c, Step S135 is executed.

FIG. 25 shows an example of the connection history recorded on the recording medium 150. In the connection history, three MAC addresses and an adjustment value are associated with each other. The three MAC addresses are identification information of the three wireless modules of the wireless unit 210c.

A first wireless module and a second wireless module may be different from each other. The first wireless module is one of the wireless modules of the wireless unit 210c used when the wireless unit 140c and the wireless unit 210c connect to each other for the first time. The second wireless module is one of the wireless modules of the wireless unit 210c used when the wireless unit 140c and the wireless unit 210c connect to each other next.

When the first wireless module connects to the wireless unit 140c, the MAC address of each of the first wireless module and the second wireless module is recorded on the recording medium 150. When the second wireless module connects to the wireless unit 140c, the MAC address of the second wireless module is already recorded on the recording medium 150. Therefore, the processor 132 can use the adjustment value associated with the MAC address.

Figure 26:
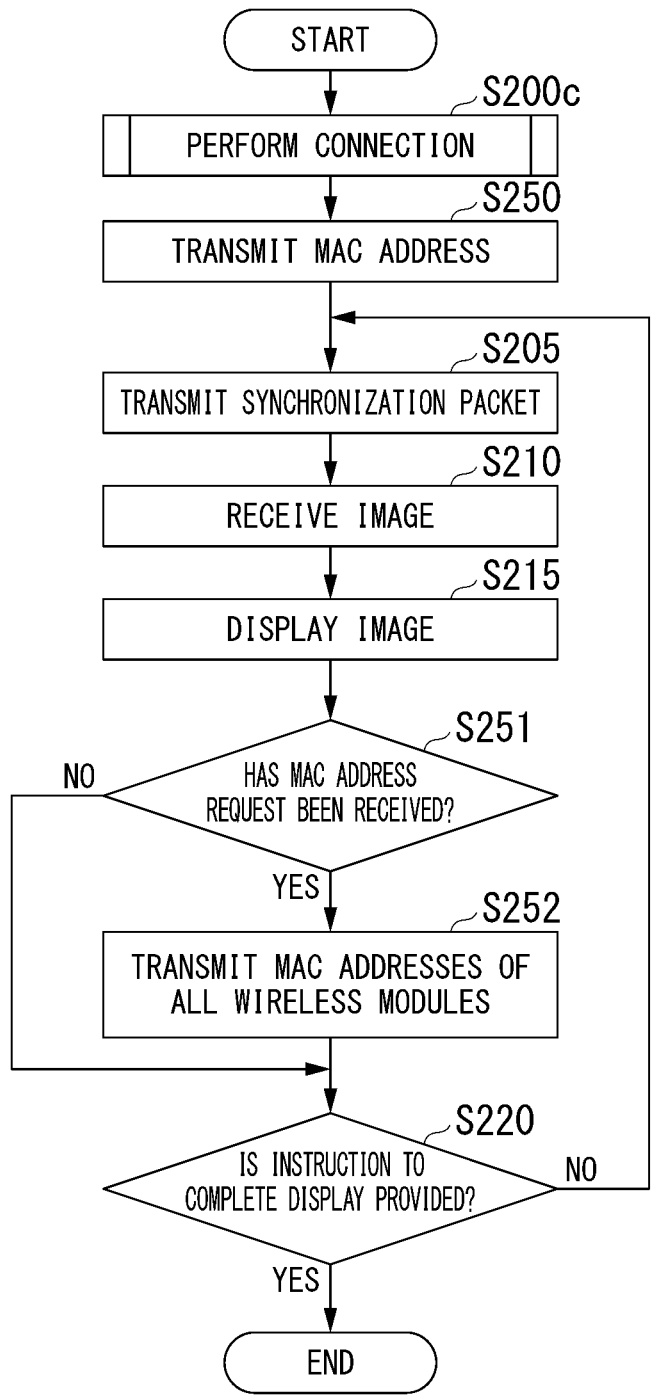
FIG. 26 is a flow chart showing a procedure of an operation of the reception terminal according to the third embodiment of the present invention.

An operation of the reception terminal 200c will be described. FIG. 26 shows a procedure of the operation of the reception terminal 200c. The same processing as that shown in FIG. 6 will not be described.

Figure 27:
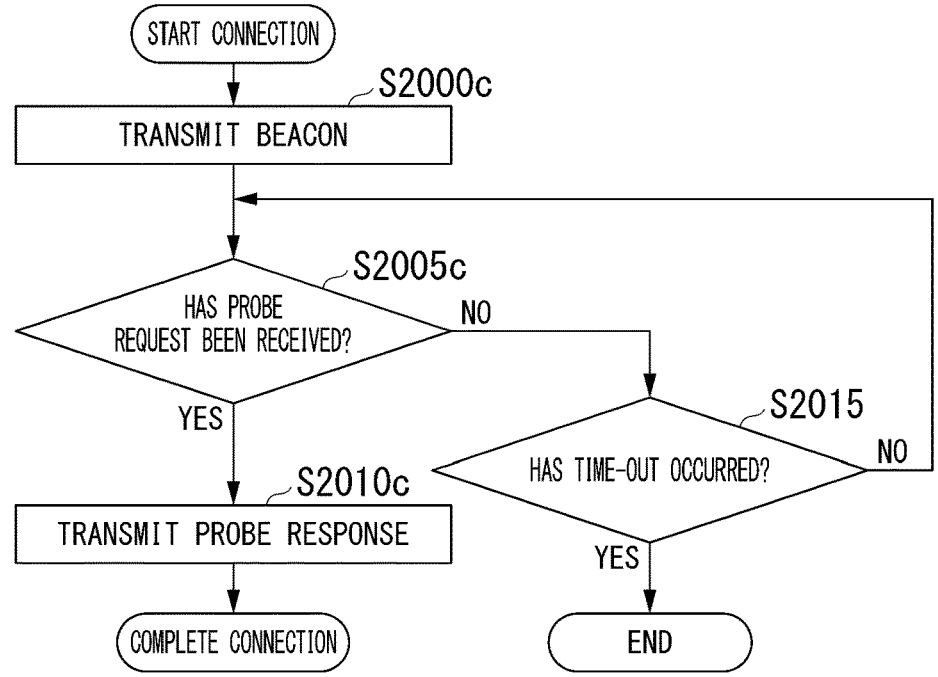
FIG. 27 is a flow chart showing a procedure of an operation of the reception terminal according to the third embodiment of the present invention.

The control unit 230 executes connection processing (Step S200c). The connection processing in the third embodiment is different from that in the first embodiment. Details of the connection processing (Step S200c) executed in the reception terminal 200c will be described. FIG. 27 shows a procedure of an operation of the reception terminal 200c in the connection processing.

The control unit 230 transmits a beacon to one of the wireless modules of the wireless unit 140c of the transmission terminal 100c by using one of the wireless modules of the wireless unit 210c (Step S2000c).

After Step S2000c, one of the wireless modules of the wireless unit 210c waits in order to receive a connection request (probe request). When the connection request is transmitted from one of the wireless modules of the wireless unit 140c, one of the wireless modules of the wireless unit 210c receives the connection request. The control unit 230 determines whether or not the connection request has been received (Step S2005c). For example, the control unit 230 determines in Step S2005c whether or not the connection request is received within a predetermined time from the timing at which the beacon is transmitted.

When the control unit 230 determines that the connection request has been received in Step S2005c, the control unit 230 transmits a connection confirmation (probe response) to one of the wireless modules of the wireless unit 140c by using one of the wireless modules of the wireless unit 210c (Step S2010c). When Step S2010c is executed, the processing shown in FIG. 26 is completed and Step S250 shown in FIG. 25 is executed. In this case, the connection between one of the wireless modules of the wireless unit 140c and one of the wireless modules of the wireless unit 210c is established. The wireless unit 140c and the wireless unit 210c can perform communication of an image. The wireless module 211, the wireless module 212, and the wireless module 213 of the wireless unit 210c may execute the connection processing independently of each other.

When the control unit 230 determines that the connection request has not been received in Step S2005c, the control unit 230 determines whether or not a time-out has occurred (Step S2015). Step S2015 is the same as that shown in FIG. 10.

When the control unit 230 determines that the time-out has occurred in Step S2015, the processing shown in FIG. 26 and FIG. 25 is completed. When the control unit 230 determines that the time-out has not occurred in Step S2015, Step S2005c is executed.

The operation of the reception terminal 200c shown in FIG. 26 will be described again. After Step S2010c, the control unit 230 transmits the MAC address of one of the wireless modules of the wireless unit 210c used for communication of the adjustment value to one of the wireless modules of the wireless unit 140c by using one of the wireless modules of the wireless unit 210c (Step S250). The wireless module used for communication of the MAC address in Step S250 may be the same as or different from that used for communication of an image in Step S210. After Step S250, Step S205 is executed.

After Step S215, the control unit 230 determines whether or not the MAC address request has been received (Step S251). When the control unit 230 determines that the MAC address request has not been received in Step S251, Step S220 is executed. The wireless module used for communication of the MAC address request in Step S251 may be the same as or different from that used for communication of an image in Step S210.

When the control unit 230 determines that the MAC address request has been received in Step S251, the control unit 230 transmits all the MAC addresses of the three wireless modules of the wireless unit 210c to one of the wireless modules of the wireless unit 140c by using one of the wireless modules of the wireless unit 210c (Step S252). The wireless module used in Step S252 is the same as that used in Step S251. After Step S252, Step S220 is executed. A data area of a synchronization packet may be used for transmitting the MAC addresses.

The communication system 10 may include a radio-frequency-identifier (RFID) tag and an RFID reader. For example, the reception terminal 200c may include an RFID reader/writer, and the transmission terminal 100c may include an RFID tag. An example in which an RFID tag and an RFID reader/writer are used for communication of MAC addresses will be described.

The RFID tag of the transmission terminal 100c is capable of communicating with the processor 132. The RFID reader/writer of the reception terminal 200c writes the MAC addresses of all the wireless modules included in the reception terminal 200c in the RFID tag of the transmission terminal 100c. When the MAC addresses are written, the RFID tag of the transmission terminal 100c outputs an interrupt signal to the processor 132. When the interrupt signal is output, the processor 132 reads the MAC address written in the RFID tag.

At this time, the processor 132 can determine whether or not the MAC address written in the RFID tag is included in the connection history recorded on the recording medium 150. Therefore, the processor 132 can determine whether or not the adjustment value associated with the MAC address is included in the connection history before the wireless module of the wireless unit 140c and the wireless module of the wireless unit 210c connect to each other.

For example, when the adjustment value is not included in the connection history, the processor 132 may notify a user that the cycle adjustment needs to be performed by using a display means such as an LED. Before the wireless module of the wireless unit 140c and the wireless module of the wireless unit 210c connect to each other, the user can figure out that video data may be lost.

Information other than a MAC address may be used as the identification information. For example, the identification information may be a combination of an SSID and a passphrase used for wireless connection.

The transmission terminal 100c may include the temperature sensor 160 shown in FIG. 15, and the reception terminal 200c may include the temperature sensor 260 shown in FIG. 16. The connection history recorded on the recording medium 150 may include the temperature measured by each of the temperature sensor 160 and the temperature sensor 260, the adjustment information indicating the adjustment value, and the identification information indicating the wireless module of the wireless unit 210c. The processor 132 may correct the adjustment value by using the method shown in the second embodiment.

In the third embodiment, when the wireless unit 140c and the wireless unit 210c connect to each other again, the processor 132 determines whether or not the MAC address of the wireless module of the wireless unit 210c is recorded on the recording medium 150. When the MAC address of the wireless module of the wireless unit 210c is recorded on the recording medium 150, the processor 132 adjusts the signal generator 131 on the basis of the adjustment value indicated by the adjustment information associated with the MAC address in the connection history. In this case, the processor 132 does not need to execute Step S160 shown in FIG. 23. Therefore, the communication system 10 can cause the cycle of the synchronization signal of the transmission terminal 100c and the cycle of the synchronization signal of the reception terminal 200c to match each other in a short period of time.

In the connection history recorded on the recording medium 150, the MAC address of each of the wireless module 211, the wireless module 212, and the wireless module 213 is associated with the adjustment information indicating one adjustment value. A combination of the MAC address of the wireless module and the adjustment information does not need to be recorded on the recording medium 150 for each wireless module. Therefore, the storage capacity of the recording medium 150 can be reduced, and a processing time for recording information on the recording medium 150 can be shortened.

Fourth Embodiment

A fourth embodiment of the present invention will be described. In the fourth embodiment, an example of a communication system including one transmission terminal and two or more reception terminals will be described. In a case in which there are two or more reception terminals, it is impossible to synchronize the Vsync for imaging of the transmission terminal with the Vsyncs for display of all the reception terminals. Therefore, each of the reception terminals synchronizes the Vsync for display with the Vsync for imaging of the transmission terminal.

Figure 28:
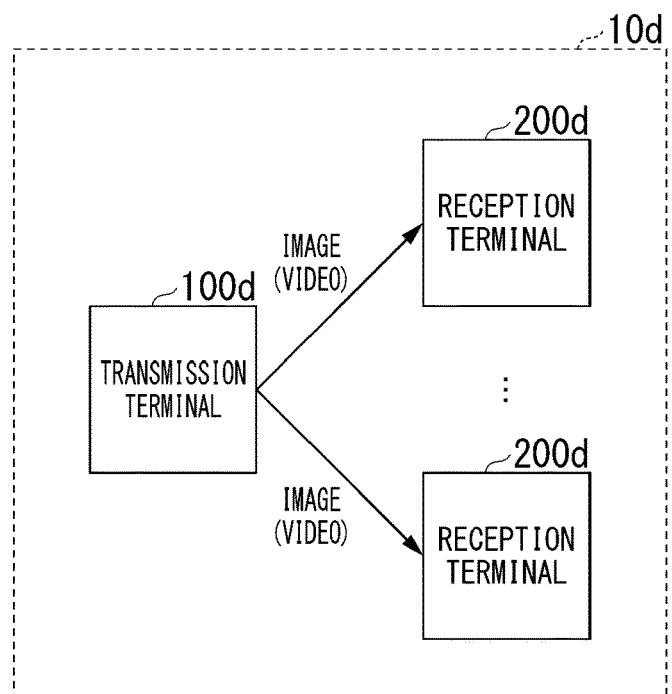
FIG. 28 is a block diagram showing a configuration of a communication system according to a fourth embodiment of the present invention.

FIG. 28 shows a configuration of a communication system 10d according to the fourth embodiment. The communication system 10d shown in FIG. 28 includes one transmission terminal 100d and two or more reception terminals 200d.

Figure 29:
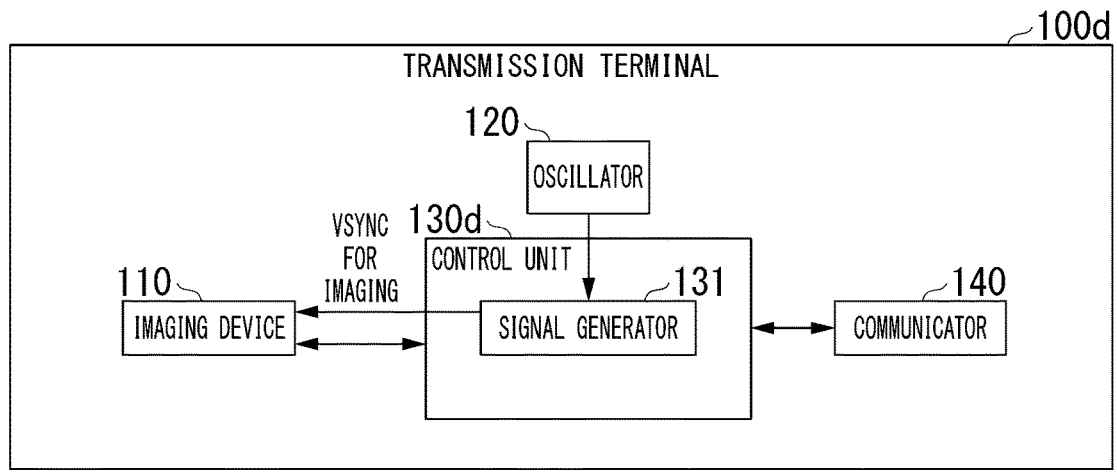
FIG. 29 is a block diagram showing a configuration of a transmission terminal according to the fourth embodiment of the present invention.

FIG. 29 shows a configuration of the transmission terminal 100d. The same configuration as that shown in FIG. 2 will not be described. In the transmission terminal 100d, the control unit 130 shown in FIG. 2 is changed to a control unit 130d. The control unit 130d does not include the processor 132 shown in FIG. 2. The transmission terminal 100d does not include the recording medium 150 shown in FIG. 2.

Figure 30:
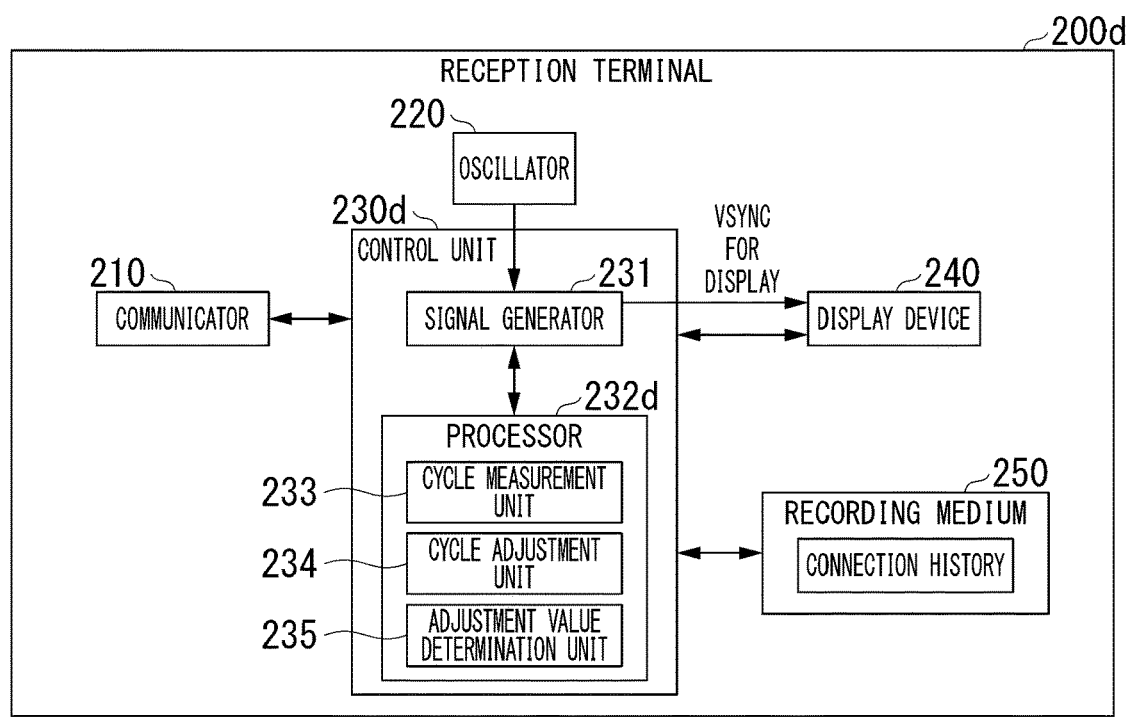
FIG. 30 is a block diagram showing a configuration of a reception terminal according to the fourth embodiment of the present invention.

FIG. 30 shows a configuration of the reception terminal 200d. The same configuration as that shown in FIG. 3 will not be described.

The reception terminal 200d includes a recording medium 250 that stores a connection history. In the connection history, the adjustment value used for adjusting the cycle of the Vsync for display and the identification information indicating the communicator 140 are associated with each other.

In the reception terminal 200d, the control unit 230 shown in FIG. 3 is changed to a control unit 230d. The control unit 230d includes a signal generator 231 and a processor 232d.

A schematic function of the processor 232d will be described. After the communicator 140 and the communicator 210 connect to each other, the processor 232d calculates an adjustment value indicating the difference between the imaging cycle and the display cycle. The processor 232d causes the imaging cycle and the display cycle to match each other by adjusting the signal generator 231 on the basis of the adjustment value. The connection history in which adjustment information indicating the adjustment value and identification information indicating the communicator 140 are associated with each other is recorded on the recording medium 250. When the communicator 140 and the communicator 210 connect to each other again, if the identification information indicating the communicator 140 is recorded on the recording medium 250, the processor 232 adjusts the signal generator 231 on the basis of the adjustment value indicated by the adjustment information associated with the identification information in the connection history.

A detailed function of the processor 232d will be described. Each time the communicator 140 and the communicator 210 connect to each other, the processor 232d acquires the identification information indicating the communicator 140. In the fourth embodiment, the communicator 140 transmits the identification information to the communicator 210. The processor 232d receives the identification information from the communicator 140 by using the communicator 210. When the processor 232d calculates the adjustment value, the processor 232d records the connection history in which the adjustment information and the identification information are associated with each other on the recording medium 250. When the communicator 140 and the communicator 210 connect to each other again, the processor 232d determines whether or not the newly acquired identification information is the same as the identification information recorded on the recording medium 250. When the processor 232d determines that the newly acquired identification information is the same as the identification information recorded on the recording medium 250, the processor 232d adjusts the signal generator 231 on the basis of the adjustment value indicated by the adjustment information associated with the identification information in the connection history.

The processor 232d has a function as a cycle measurement unit 233, a cycle adjustment unit 234, and an adjustment value determination unit 235. The cycle measurement unit 233 measures the difference between the imaging cycle and the display cycle and calculates an adjustment value indicating the difference. The cycle adjustment unit 234 adjusts the signal generator 231 on the basis of the adjustment value. The signal generator 231 is adjusted such that the cycle (display cycle) of the Vsync for display generated by the signal generator 231 matches the imaging cycle.

When the communicator 140 and the communicator 210 connect to each other again, the adjustment value determination unit 235 determines whether or not the identification information received from the communicator 140 is included in the connection history recorded on the recording medium 250. When the identification information received from the communicator 140 is included in the connection history, the adjustment value determination unit 235 determines an available adjustment value for adjusting the display cycle. When the adjustment value determination unit 235 determines that the identification information received from the communicator 140 is included in the connection history, the cycle adjustment unit 234 adjusts the signal generator 231 on the basis of the adjustment value associated with the identification information in the connection history.

The signal generator 231 includes a cycle counter that defines the cycle of the Vsync for display. The cycle of the Vsync for display is adjusted by adjusting a value measured by the cycle counter of the signal generator 231.

Figure 31:
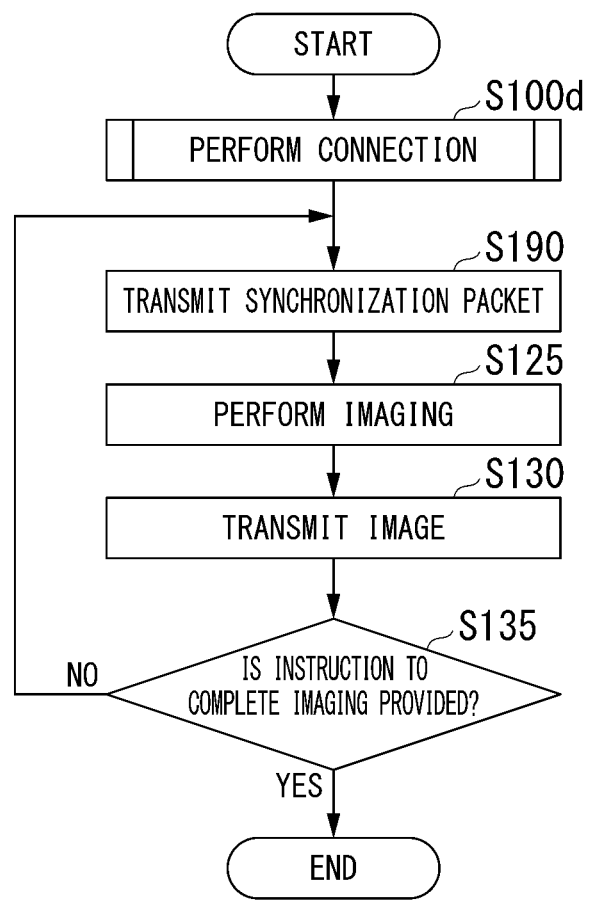
FIG. 31 is a flow chart showing a procedure of an operation of the transmission terminal according to the fourth embodiment of the present invention.

An operation of the transmission terminal 100d will be described. FIG. 31 shows a procedure of the operation of the transmission terminal 100d. The same processing as that shown in FIG. 4 will not be described.

The control unit 130d executes connection processing (Step S100d). The connection processing is the same as that shown in FIG. 7 except for Step S1000 shown in FIG. 7. The communicator 140 transmits the identification information of the communicator 140 to the communicator 210 of the reception terminal 200d in Step S1000.

In a case in which the transmission terminal 100d and the two or more reception terminals 200d deal with multi-user-MIMO (MU-MIMO), the transmission terminal 100d and each of the reception terminals 200d may connect to each other in a one-to-one relationship. The transmission terminal 100d and each of the reception terminals 200d may connect to each other by using multicast connection. In the multicast connection, the transmission terminal 100d can simultaneously perform communication with the two or more reception terminals 200d. Hereinafter, an example in which the multicast connection is used will be described.

After Step S100d, the communicator 140 transmits a synchronization packet to the communicator 210 (Step S190). Step S125, Step S130, and Step S135 are executed after Step S190.

In Step S130, an image of one frame is divided into multiple pieces of data, and each piece of the data is stored in a packet. The communicator 140 transmits a packet including the data of the image to the communicators 210 of the two or more reception terminals 200d by multicast. In a case in which the MU-MIMO is used, the image is transmitted by unicast. When the control unit 130d determines that the instruction to complete imaging is not provided in Step S135, Step S190 is executed.

In the above-described example, the communicator 140 transmits the identification information to the communicator 210. A communication method of the identification information is not limited to this. For example, the transmission terminal 100*d* may include two or more communicators including the communicator 140, and the reception terminal 200*d* may include two or more communicators including the communicator 210. A communicator of the transmission terminal 100*d* other than the communicator 140 may transmit the identification information of the communicator 140 to a communicator of the reception terminal 200*d* other than the communicator 210. In other words, the transmission terminal 100*d* may transmit the identification information to the reception terminal 200*d* by using a communicator other than the communicator 140 used for transmitting an image.

Figure 32:
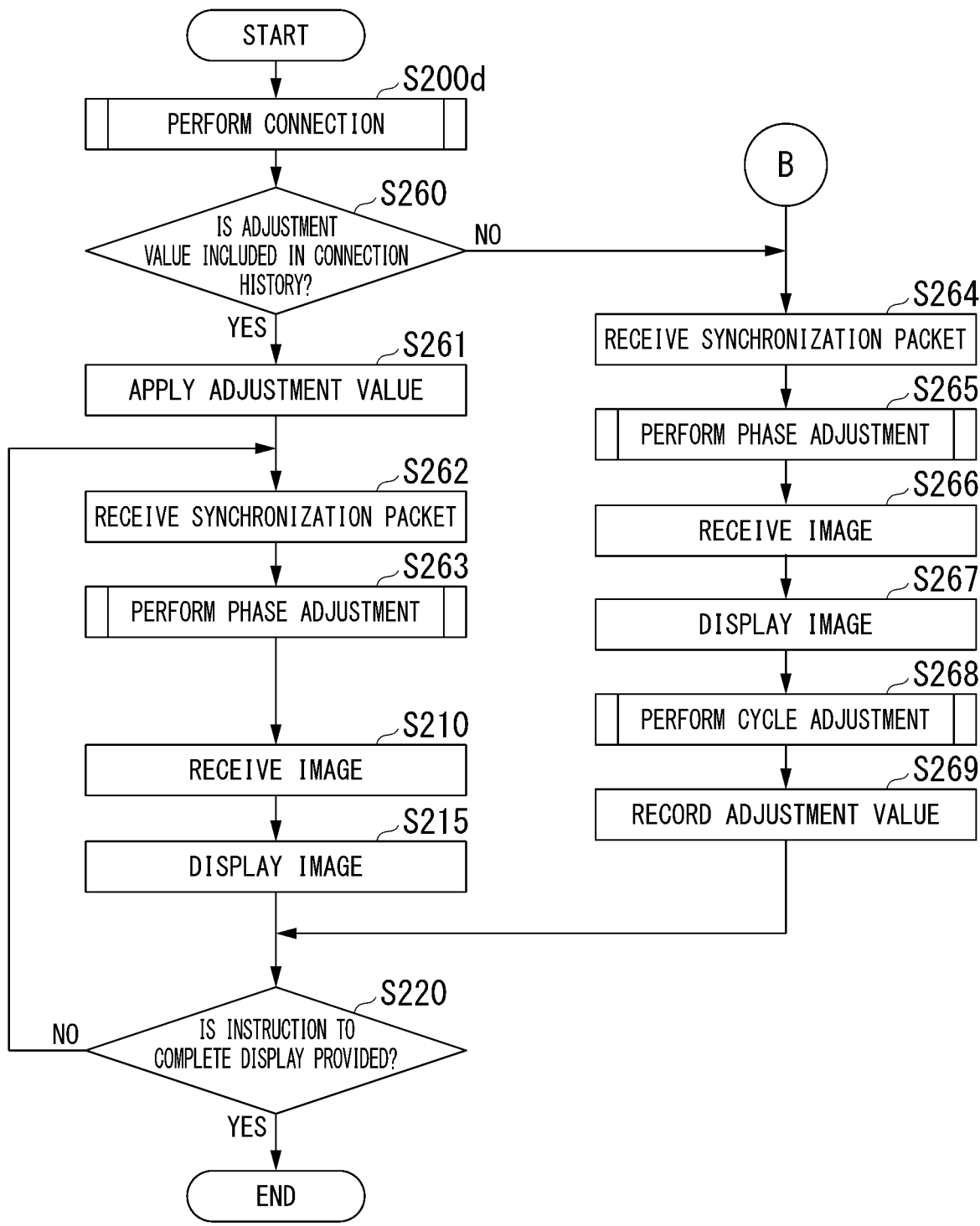
FIG. 32 is a flow chart showing a procedure of an operation of the reception terminal according to the fourth embodiment of the present invention.

An operation of the reception terminal 200*d* will be described. FIG. 32 shows a procedure of the operation of the reception terminal 200*d*. The same processing as that shown in FIG. 6 will not be described.

The processor 232*d* executes connection processing (Step S200*d*). The connection processing is the same as that shown in FIG. 10 except for Step S2000 shown in FIG. 10. The processor 232*d* receives the identification information of the communicator 140 of the transmission terminal 100*d* from the communicator 140 by using the communicator 210 in Step S2000.

After Step S200*d*, the processor 232*d* determines whether or not the identification information received from the communicator 140 is included in the connection history recorded on the recording medium 250. In this way, the processor 232*d* determines whether or not the adjustment value is included in the connection history (Step S260). When the communicator 140 and the communicator 210 connect to each other for the first time, the adjustment value and the identification information of the communicator 140 are not included in the connection history. When the identification information is not included in the connection history, the processor 232*d* determines that the adjustment value is not included in the connection history. When the communicator 140 and the communicator 210 have a history of connecting to each other and the communicator 140 and the communicator 210 connect to each other again, the adjustment value and the identification information of the communicator 140 are included in the connection history. When the identification information is included in the connection history, the processor 232*d* determines that the adjustment value is included in the connection history.

When the processor 232*d* determines that the adjustment value is included in the connection history in Step S260, the processor 232*d* reads the adjustment value associated with the identification information received from the communicator 140 in the connection history from the recording medium 250. The processor 232*d* adjusts the cycle of the Vsync for display by applying the adjustment value to the signal generator 231 (Step S261). In this way, the cycle of the Vsync for imaging and the cycle of the Vsync for display match each other. The method of adjusting the cycle of the Vsync for display in Step S261 is similar to that of adjusting the cycle of the Vsync for display in Step S2685 (see FIG. 34) described later.

After Step S261, the communicator 210 waits in order to receive a synchronization packet. When the synchronization packet is transmitted from the communicator 140, the communicator 210 receives the synchronization packet. The processor 232*d* acquires the synchronization packet from the communicator 210 (Step S262).

After Step S262, the processor 232*d* performs phase adjustment (Step S263). The processor 232*d* causes the timing of the V sync for display to match the timing of the Vsync for imaging in Step S263, thus causing the phase of the Vsync for display to match the phase of the Vsync for imaging. Details of Step S263 will be described later.

Step S210, Step S215, and Step S220 are executed after Step S263. When the processor 232*d* determines that the instruction to complete display is not provided in Step S220, Step S262 is executed.

When the processor 232*d* determines that the adjustment value is not included in the connection history in Step S260, the communicator 210 waits in order to receive a synchronization packet. When the synchronization packet is transmitted from the communicator 140, the communicator 210 receives the synchronization packet. The processor 232*d* acquires the synchronization packet from the communicator 210 (Step S264).

After Step S264, the processor 232*d* performs the phase adjustment (Step S265). Step S265 is similar to Step S263.

After Step S265, the communicator 210 receives an image from the communicator 140 (Step S266). The received image is output to the display device 240 via the control unit 230*d*. After Step S266, the display device 240 displays the image in accordance with the Vsync for display (Step S267).

After Step S267, the processor 232*d* performs cycle adjustment (Step S268). The processor 232*d* causes the cycle of the Vsync for display to match the cycle of the Vsync for imaging in Step S268. Details of Step S268 will be described later.

After Step S268, the processor 232*d* associates the adjustment value calculated in Step S268 and the identification information of the communicator 140 with each other. The processor 232*d* records the connection history including the adjustment value and the identification information on the recording medium 250 (Step S269). After Step S269, Step S220 is executed.

The processor 232*d* may record a time point at which the adjustment value is calculated or a time point at which the cycle is adjusted on the basis of the adjustment value on the recording medium 250 along with the identification information and the adjustment value in Step S269. When a predetermined time has passed from the time point recorded on the recording medium 250, the processor 232*d* may delete the adjustment value associated with the time point. Alternatively, when a predetermined time has passed from the time point recorded on the recording medium 250, the processor 232*d* does not need to use the adjustment value associated with the time point in Step S261.

The cycle adjustment in Step S268 may be performed twice or more. For example, the cycle adjustment may be performed on a regular basis while the connection between the communicator 140 and the communicator 210 continues.

In the above-described example, the communicator 210 receives the identification information of the communicator 140 from the communicator 140. In a case in which the transmission terminal 100*d* includes two or more communicators and the reception terminal 200*d* includes two or more communicators, a communicator of the reception terminal 200*d* other than the communicator 210 may receive the identification information of the communicator 140 from a communicator of the transmission terminal 100*d* other than the communicator 140. In other words, the reception terminal 200*d* may receive the identification information from the transmission terminal 100*d* by using a communicator other than the communicator 210 used for receiving an image.

Figure 33:
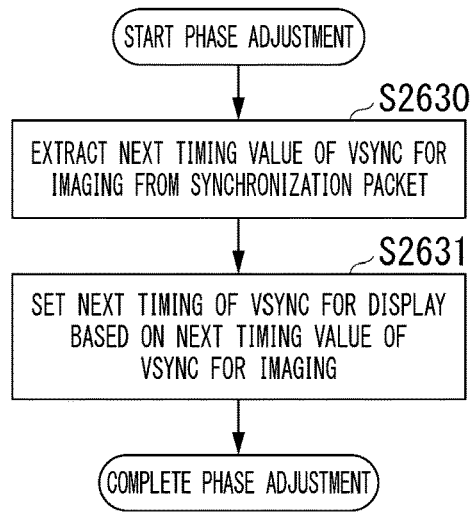
FIG. 33 is a flow chart showing a procedure of an operation of the reception terminal according to the fourth embodiment of the present invention.

Details of the phase adjustment (Step S263 and Step S265) performed in the reception terminal 200*d* will be described. FIG. 33 shows a procedure of an operation of the reception terminal 200*d* in the phase adjustment.

The synchronization packet received in Step S262 or Step S264 includes a value indicating a timing of a next pulse of the Vsync for imaging. The processor 232d extracts the value from the synchronization packet (Step S2630).

After Step S2630, the processor 232d calculates a timing of a next pulse of the Vsync for display on the basis of the value extracted from the synchronization packet. The processor 232d sets the calculated timing in the signal generator 231 (Step S2631). When Step S2631 is executed, the processing shown in FIG. 33 is completed and Step S210 or Step S266 shown in FIG. 32 is executed.

For example, the synchronization packet includes information indicating a time point of a next pulse of the Vsync for imaging. The processor 232d subtracts a value indicating a time point at which the synchronization packet is received from a value indicating the time point of the next pulse of the Vsync for imaging in Step S2631. In this way, the processor 232d calculates a required time before the timing of the next pulse of the Vsync for display. The processor 232d adjusts the signal generator 231 in order to cause the signal generator 231 to generate a pulse of the Vsync for display when the calculated time has passed.

In a case in which the synchronization packet is not received in Step S262 or Step S264, imaging is performed without performing the phase adjustment and an image is received.

Figure 34:
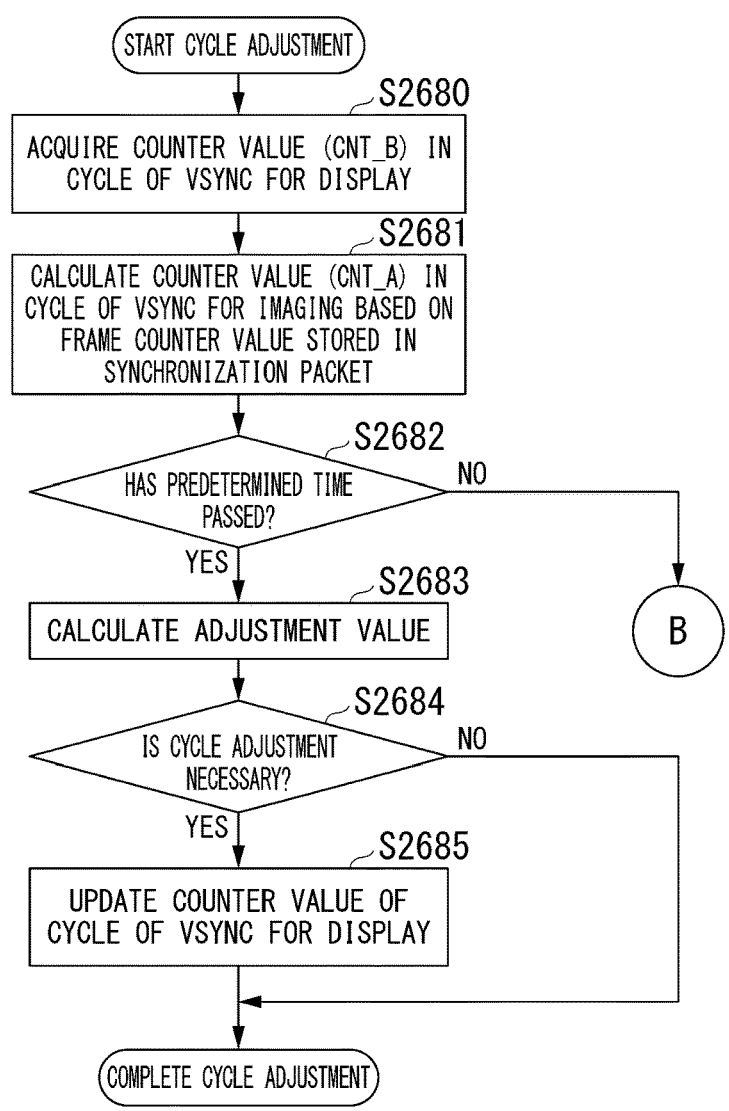
FIG. 34 is a flow chart showing a procedure of an operation of the reception terminal according to the fourth embodiment of the present invention.

Details of the cycle adjustment (Step S268) performed in the reception terminal 200d will be described. FIG. 34 shows a procedure of an operation of the reception terminal 200d in the cycle adjustment. A similar method to that shown in PCT International Publication No. WO2018/235258 can be applied to the cycle adjustment in the embodiments of the present invention.

The processor 232d acquires a counter value CNT_B in the cycle of the Vsync for display from the signal generator 231 (Step S2680). The signal generator 231 includes a counter that measures time. The value (counter value CNT_B) of the counter increases from an initial value at a reference timing. The processor 232d acquires the counter value CNT_B at a timing at which a pulse synchronized with the cycle of the Vsync for display is generated in Step S2680. The counter value CNT_B corresponds to the length of a predetermined number of cycles of the Vsync for display.

After Step S2680, the processor 232d extracts a frame counter value from the synchronization packet received in Step S264. The frame counter value indicates the number of frame periods included in a period starting at the reference timing. For example, in a case in which the imaging cycle and the display cycle are 16.6 milliseconds, the length of one frame period is 16.6 milliseconds. The frame counter value corresponds to a frame number. The processor 232d calculates a counter value CNT_A in the cycle of the Vsync for imaging on the basis of the frame counter value (Step S2681).

The signal generator 131 of the transmission terminal 100d includes a counter that measures time. The value (counter value CNT_A) of the counter increases from an initial value at a reference timing. The counter value CNT_A increases by a fixed value in one frame period. For example, the fixed value is 1000000. The fixed value is not limited to 1000000. The processor 232d calculates the counter value CNT_A by multiplying the fixed value by the frame counter value.

The fixed value may be recorded on the recording medium 250. When the communicator 140 and the communicator 210 connect to each other, the processor 232d may receive the fixed value from the communicator 140 by using the communicator 210. The fixed value may be stored in the synchronization packet.

After Step S2681, the processor 232d determines whether or not a predetermined time has passed (Step S2682). For example, the predetermined time is 60 seconds. The predetermined time may be a time other than 60 seconds. For example, the processor 232d determines a time passing from the tuning at which the communicator 140 and the communicator 210 connect to each other. When the time is shorter than the predetermined time, the processor 232d determines that the predetermined time has not passed. When the time is longer than or equal to the predetermined time, the processor 232d determines that the predetermined time has passed.

When the processor 232d determines that the predetermined time has not passed in Step S2682, Step S264 is executed. The synchronization packet is repetitively received and the counter value CNT_A and the counter value CNT_B are repetitively acquired until the predetermined time passes. When the processor 232d determines that the predetermined time has passed in Step S2682, the processor 232d measures the difference between the cycle of the Vsync for imaging and the cycle of the Vsync for display and calculates the adjustment value indicating the difference (Step S2683). The processor 232d calculates the adjustment value in Step S2683 by using Expression (1), Expression (2), and Expression (3) shown in the first embodiment.

After Step S2683, the processor 232d determines whether or not the cycle adjustment is necessary (Step S2684). The processor 232d calculates the difference between the maximum value of the cycle counter of the signal generator 131 and the maximum value of the cycle counter of the signal generator 231 in Step S2684. The processor 232d determines whether or not the adjustment value is less than the difference in Step S2684. When the adjustment value is less than the difference, the processor 232d determines that the cycle adjustment is necessary. When the adjustment value is greater than the difference, the processor 232d determines that the cycle adjustment is unnecessary. For example, when the difference is a value corresponding to 50 ppm and the adjustment value is a value corresponding to 10 ppm, the processor 232d determines that the cycle adjustment is necessary.

The maximum value of the cycle counter of each of the signal generator 131 and the signal generator 231 may be recorded on the recording medium 250. When the communicator 140 and the communicator 210 connect to each other, the processor 232d may receive the maximum value of the cycle counter of the signal generator 131 from the communicator 140 by using the communicator 210. The maximum value of the cycle counter of the signal generator 131 may be stored in the synchronization packet.

When the processor 232d determines that the cycle adjustment is necessary in Step S2684, the processor 232d updates the value of the cycle counter of the signal generator 231 on the basis of the calculated adjustment value (Step S2685). The processor 232d causes the cycle of the Vsync for imaging and the cycle of the Vsync for display to match each other by executing Step S2685.

When the adjustment value is positive, the cycle of the Vsync for display is longer than that of the Vsync for imaging. In this case, the processor 232d calculates a new maximum value by subtracting the adjustment value from the current maximum value of the cycle counter of the signal generator 231 in Step S2685 in order to shorten the cycle of the Vsync for display. The processor 232d updates the current maximum value of the cycle counter of the signal generator 231 with the new maximum value in Step S2685.

When the adjustment value is negative, the cycle of the Vsync for display is shorter than that of the Vsync for imaging. In this case, the processor 232d calculates a new maximum value by adding the adjustment value to the current maximum value of the cycle counter of the signal generator 231 in Step S2685 in order to lengthen the cycle of the Vsync for display. The processor 232d updates the current maximum value of the cycle counter of the signal generator 231 with the new maximum value in Step S2685.

When Step S2685 is executed, the processing shown in FIG. 34 is completed and Step S269 shown in FIG. 32 is executed. When the processor 232d determines that the cycle adjustment is unnecessary in Step S2684, the processing shown in FIG. 34 is completed and Step S269 shown in FIG. 32 is executed.

The adjustment value calculated in Step S2683 is recorded on the recording medium 250 in Step S269 shown in FIG. 32. When the processor 232d determines that the cycle adjustment is unnecessary in Step S2684, information indicating that the cycle adjustment is unnecessary may be recorded on the recording medium 250 in Step S269 shown in FIG. 32. The information is associated with the identification information of the communicator 140.

When the processor 232d determines that the identification information received from the communicator 140 is included in the connection history in Step S260 shown in FIG. 32, the processor 232d may execute the following processing. When the adjustment value is associated with the identification information in the connection history, the processor 232d executes Step S261 described above. When the information indicating that the cycle adjustment is unnecessary is associated with the identification information in the connection history, the processor 232d may execute Step S262 without executing Step S261.

In the above-described example, the adjustment value for adjusting the cycle of the Vsync for display is the difference between the cycle of the Vsync for imaging and the cycle of the Vsync for display. When the specifications of the original oscillation clock generated by the oscillator 120 of the transmission terminal 100d are the same as those of the original oscillation clock generated by the oscillator 220 of the reception terminal 200d, the difference between the cycle deviations may be used as the adjustment value as in the first embodiment.

In the above-described example, the adjustment information is configured to be information directly indicating the adjustment value. The adjustment information may be configured to be information indirectly indicating the adjustment value as in the first embodiment.

In the above-described example, the cycle of the vertical synchronization signal (Vsync for display) is adjusted. The cycle of the horizontal synchronization signal may be adjusted by using a similar method to that described above.

In the above-described example, the communication system 10d includes the two or more reception terminals 200d. Even in a communication system including one transmission terminal 100d and one reception terminal 200d, the cycle of the Vsync for display can be adjusted by using a similar method to that described above.

The transmission terminal 100d may include the temperature sensor 160 shown in FIG. 15, and the reception terminal 200d may include the temperature sensor 260 shown in FIG. 16. The connection history recorded on the recording medium 250 may include the temperature measured by each of the temperature sensor 160 and the temperature sensor 260, the adjustment information indicating the adjustment value, and the identification information indicating the communicator 140. The processor 232d may correct the adjustment value by using the method shown in the second embodiment.

Specifically, in the connection history, the temperature measured by each of the temperature sensor 160 and the temperature sensor 260 is associated with the adjustment information and the identification information. When the communicator 140 and the communicator 210 connect to each other again, if the identification information of the communicator 140 is recorded on the recording medium 250, the processor 232d determines whether or not to correct the adjustment value on the basis of the temperature measured by each of the temperature sensor 160 and the temperature sensor 260 and the temperature associated with the identification information in the connection history. When the processor 232d determines to correct the adjustment value, the processor 232d corrects the adjustment value indicated by the adjustment information associated with the identification information in the connection history on the basis of the temperature characteristics of the original oscillation clock of each of the Vsync for imaging and the Vsync for display. The processor 232d adjusts the signal generator 231 on the basis of the corrected adjustment value.

In a case in which the transmission terminal 100d includes two or more communicators, two or more pieces of the identification information may be associated with one adjustment value in the connection history as in the third embodiment.

A communication method according to each aspect of the present invention includes a calculation step, a first adjustment step, and a second adjustment step. After the communicator 140 and the communicator 210 connect to each other, the processor 232d calculates an adjustment value indicating the difference between the imaging cycle and the display cycle in the calculation step (Step S2683). The processor 232d causes the imaging cycle and the display cycle to match each other by adjusting the signal generator 231 on the basis of the adjustment value in the first adjustment step (Step S2685). A connection history in which adjustment information and identification information are associated with each other is recorded on the recording medium 250. The adjustment information directly or indirectly indicates the adjustment value. The identification information indicates one of the communicator 140 and the communicator 210. When the communicator 140 and the communicator 210 connect to each other again, if the identification information corresponding to one of the communicator 140 and the communicator 210 is recorded on the recording medium 250, the processor 232d adjusts the signal generator 231 on the basis of the adjustment value indicated by the adjustment information associated with the identification information in the connection history in the second adjustment step (Step S261)

The communication method according to each aspect of the present invention does not need to include steps other than the calculation step, the first adjustment step, or the second adjustment step.

In the fourth embodiment, when the communicator 140 and the communicator 210 connect to each other again, the processor 232d determines whether or not the identification information of the communicator 140 is recorded on the recording medium 250. When the identification information of the communicator 140 is recorded on the recording medium 250, the processor 232d adjusts the signal generator 231 on the basis of the adjustment value indicated by the adjustment information associated with the identification information in the connection history. In this case, the processor 232d does not need to execute Step S268 shown in FIG. 32. Therefore, the communication system 10d can cause the cycle of the synchronization signal of the transmission terminal 100d and the cycle of the synchronization signal of the reception terminal 200d to match each other in a short period of time.

In the communication system 10d including the two or more reception terminals 200d, each reception terminal 200d can perform the cycle adjustment by causing the cycle of the V sync for display to match the cycle of the V sync for imaging.

While preferred embodiments of the invention have been described and shown above, it should be understood that these are examples of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A communication system, comprising:
a transmission terminal comprising:
    a first signal generator configured to generate a first synchronization signal that defines an imaging cycle; and
    a first communicator configured to transmit an image generated by an imaging device that performs imaging of a subject in accordance with the first synchronization signal; and
a reception terminal comprising:
    a second communicator configured to receive the image transmitted by the first communicator; and
    a second signal generator configured to generate a second synchronization signal that defines a display cycle,
wherein the image received by the second communicator is output to a display device that displays the image in accordance with the second synchronization signal,
wherein one of the transmission terminal and the reception terminal comprises:
    a recording medium; and
    a processor configured to adjust one of the first signal generator and the second signal generator,
wherein the processor is configured to calculate an adjustment value indicating a difference between the imaging cycle and the display cycle after the first communicator and the second communicator connect to each other,
wherein the processor is configured to cause the imaging cycle and the display cycle to match each other by adjusting the first signal generator on the basis of the adjustment value in a first case in which the transmission terminal includes the processor,
wherein the processor is configured to cause the imaging cycle and the display cycle to match each other by adjusting the second signal generator on the basis of the adjustment value in a second case in which the reception terminal includes the processor,
wherein a connection history in which adjustment information and identification information are associated with each other is recorded on the recording medium,
wherein the adjustment information directly or indirectly indicates the adjustment value,
wherein the identification information indicates one of the first communicator and the second communicator,
wherein the processor is configured to adjust the first signal generator on the basis of the adjustment value indicated by the adjustment information associated with the identification information corresponding to the second communicator in the connection history when the first communicator and the second communicator connect to each other again in the first case, and
wherein the processor is configured to adjust the second signal generator on the basis of the adjustment value indicated by the adjustment information associated with the identification information corresponding to the first communicator in the connection history when the first communicator and the second communicator connect to each other again in the second case.

2. The communication system according to claim 1,
wherein the transmission terminal further comprises a first temperature sensor,
wherein the reception terminal further comprises a second temperature sensor,
wherein a temperature measured by each of the first temperature sensor and the second temperature sensor is associated with the adjustment information and the identification information in the connection history,
wherein the processor is configured to determine whether or not to correct the adjustment value on the basis of a temperature measured by each of the first temperature sensor and the second temperature sensor and the temperature associated with the identification information corresponding to one of the first communicator and the second communicator in the connection history when the first communicator and the second communicator connect to each other again,
wherein the processor is configured to correct the adjustment value indicated by the adjustment information associated with the identification information corresponding to one of the first communicator and the second communicator in the connection history on the basis of temperature characteristics of an original oscillation clock of each of the first synchronization signal and the second synchronization signal when the processor determines to correct the adjustment value,
wherein the processor is configured to adjust the first signal generator on the basis of the corrected adjustment value in the first case, and
wherein the processor is configured to adjust the second signal generator on the basis of the corrected adjustment value in the second case.

3. The communication system according to claim 1,
wherein the transmission terminal comprises the processor,
wherein the processor is configured to acquire the identification information indicating the second communicator each time the first communicator and the second communicator connect to each other,
wherein the processor is configured to record the connection history in which the adjustment information and the identification information are associated with each other on the recording medium when the processor calculates the adjustment value,
wherein the processor is configured to determine whether or not the newly acquired identification information is the same as the identification information recorded on the recording medium when the first communicator and the second communicator connect to each other again, and
wherein the processor is configured to adjust the first signal generator on the basis of the adjustment value indicated by the adjustment information associated with the identification information in the connection history when the processor determines that the newly acquired identification information is the same as the identification information recorded on the recording medium.

4. The communication system according to claim 3,
wherein the imaging device includes one or more first wireless modules,
wherein the first communicator is one of the one or more first wireless modules,
wherein the reception terminal includes two or more second wireless modules,
wherein the second communicator is one of the two or more second wireless modules,
wherein the first communicator and the second communicator perform wireless communication,
wherein the identification information is a media access control (MAC) address of one of the two or more second wireless modules, and
wherein the identification information of each of the two or more second wireless modules is associated with the adjustment information in the connection history.

5. The communication system according to claim 1,
wherein the reception terminal comprises the processor,
wherein the processor is configured to acquire the identification information indicating the first communicator each time the first communicator and the second communicator connect to each other,
wherein the processor is configured to record the connection history in which the adjustment information and the identification information are associated with each other on the recording medium when the processor calculates the adjustment value,
wherein the processor is configured to determine whether or not the newly acquired identification information is the same as the identification information recorded on the recording medium when the first communicator and the second communicator connect to each other again, and
wherein the processor is configured to adjust the second signal generator on the basis of the adjustment value indicated by the adjustment information associated with the identification information in the connection history when the processor determines that the newly acquired identification information is the same as the identification information recorded on the recording medium.

6. The communication system according to claim 5,
wherein the communication system comprises two or more of the reception terminals.

7. A communication method, comprising:
a calculation step executed by a processor included in one of a transmission terminal and a reception terminal;
a first adjustment step executed by the processor; and
a second adjustment step executed by the processor,
wherein the transmission terminal comprises:
a first signal generator configured to generate a first synchronization signal that defines an imaging cycle; and
a first communicator configured to transmit an image generated by an imaging device that performs imaging of a subject in accordance with the first synchronization signal; and
wherein the reception terminal comprises:
a second communicator configured to receive the image transmitted by the first communicator; and
a second signal generator configured to generate a second synchronization signal that defines a display cycle,
wherein the image received by the second communicator is output to a display device that displays the image in accordance with the second synchronization signal,
wherein the processor calculates an adjustment value indicating a difference between the imaging cycle and the display cycle in the calculation step after the first communicator and the second communicator connect to each other,
wherein the processor causes the imaging cycle and the display cycle to match each other by adjusting the first signal generator on the basis of the adjustment value in the first adjustment step in a first case in which the transmission terminal includes the processor,
wherein the processor causes the imaging cycle and the display cycle to match each other by adjusting the second signal generator on the basis of the adjustment value in the first adjustment step in a second case in which the reception terminal includes the processor,
wherein a connection history in which adjustment information and identification information are associated with each other is recorded on a recording medium,
wherein the adjustment information directly or indirectly indicates the adjustment value,
wherein the identification information indicates one of the first communicator and the second communicator,
wherein the processor adjusts the first signal generator on the basis of the adjustment value indicated by the adjustment information associated with the identification information corresponding to the second communicator in the connection history in the second adjustment step when the first communicator and the second communicator connect to each other again in the first case, and
wherein the processor adjusts the second signal generator on the basis of the adjustment value indicated by the adjustment information associated with the identification information corresponding to the first communicator in the connection history in the second adjustment step when the first communicator and the second communicator connect to each other again in the second case.

* * * * *